United States Patent
Azais et al.

(10) Patent No.: US 9,461,288 B2
(45) Date of Patent: Oct. 4, 2016

(54) SEPARATOR FILM, ITS FABRICATION METHOD, SUPERCAPACITOR, BATTERY AND CAPACITOR PROVIDED WITH SAID FILM

(75) Inventors: Philippe Azais, Quimper (FR); Lucien Tamic, Ergue Gaberic (FR); Audrey Anne-Marie Tamic, legal representative, Arcueil (FR); Marion Anne-Sophie Tamic, legal representative, Ergue-Gaberic (FR); Marilyne Gaëlle Tamic, legal representative, Laignelet (FR); Hélène Marie-France Tamic, legal representative, Plougonven (FR); Andre Huitric, Ergue Gaberic (FR); Frederic Paulais, Quimper (FR); Xavier Rohel, Quimper (FR)

(73) Assignee: BOLLORE, Ergue Gaberic (FR)

( * ) Notice: Subject to any disclaimer, the term of this patent is extended or adjusted under 35 U.S.C. 154(b) by 1010 days.

(21) Appl. No.: 13/517,967

(22) PCT Filed: Dec. 21, 2010

(86) PCT No.: PCT/EP2010/070409
§ 371 (c)(1),
(2), (4) Date: Nov. 8, 2012

(87) PCT Pub. No.: WO2011/076805
PCT Pub. Date: Jun. 30, 2011

(65) Prior Publication Data
US 2013/0052539 A1 Feb. 28, 2013

(30) Foreign Application Priority Data
Dec. 21, 2009 (FR) .................................... 09 59313

(51) Int. Cl.
*C08J 5/18* (2006.01)
*C08L 53/00* (2006.01)
*C08L 23/14* (2006.01)
*C08L 23/10* (2006.01)
*H01M 2/16* (2006.01)
*C08L 23/16* (2006.01)
*H01M 10/052* (2010.01)

(52) U.S. Cl.
CPC ............... *H01M 2/1653* (2013.01); *C08J 5/18* (2013.01); *C08L 23/10* (2013.01); *C08L 23/14* (2013.01); *C08L 23/16* (2013.01); *H01M 10/052* (2013.01); *C08J 2323/14* (2013.01); *C08J 2423/12* (2013.01); *Y02E 60/122* (2013.01)

(58) Field of Classification Search
CPC ........ H01M 2/16; H01M 10/052; C08J 5/18; C08L 23/10; C08L 23/14; C08L 53/00; C08L 2205/242; C08L 2205/035; C08L 2205/03; C08L 2205/02; C08L 51/06; C08L 23/20; C08L 23/12
USPC ............ 429/249; 428/315.5, 317.9; 521/128, 521/143, 84.1, 90
See application file for complete search history.

(56) References Cited

U.S. PATENT DOCUMENTS 5,317,035 A * 5/1994 Jacoby et al. ................. 521/143
8,680,169 B2 * 3/2014 Yamada et al. ............... 521/143

FOREIGN PATENT DOCUMENTS

| EP | 0 492 942 A2 | 7/1992 |
|---|---|---|
| EP | 2 018 962 A1 | 1/2009 |
| JP | 60-162645 A | 8/1985 |
| JP | 07-053748 A | 2/1995 |
| JP | 09-082565 A | 3/1997 |
| JP | 11-060789 A | 3/1999 |
| JP | 2004-508979 A | 3/2004 |
| JP | 2006-089727 A | 4/2006 |
| JP | 2008/111134 A | 5/2008 |
| JP | 2008-201814 A | 9/2008 |
| JP | 2009-108323 | 5/2009 |
| JP | 2009-170691 A | 7/2009 |
| WO | WO 2007/046226 A1 | 4/2007 |

* cited by examiner

*Primary Examiner* — Nathan M Nutter
(74) *Attorney, Agent, or Firm* — Blakely Sokoloff Taylor & Zafman LLP

(57) ABSTRACT

The invention relates to a separator film for a device used for storing electrical energy, the film being porous and oriented, and being obtained by stretching in a longitudinal direction and in a direction transverse to the longitudinal direction, the film containing a mixture comprising a polypropylene homopolymer, at least 10% of a copolymer obtained from monomers comprising at least propylene and ethylene, and at least one beta-nucleating agent. According to the invention, the ethylene content of the copolymer is ≥1% but <10% and a propylene content of the copolymer is ≥90% for a film thickness of ≥8 microns and ≤30 microns, corresponding to a specified space factor according to the IEC-60674-3-1 standard greater than or equal to 145% and a density of the biaxially stretched film greater than or equal to 0.18 g/cm³ but less than or equal to 0.41 g/cm³.

15 Claims, 14 Drawing Sheets

SEPARATOR FILM, ITS FABRICATION METHOD, SUPERCAPACITOR, BATTERY AND CAPACITOR PROVIDED WITH SAID FILM

This is a non-provisional application claiming the benefit of International Application Number PCT/EP2010/070409 filed Dec. 21, 2010.

The invention relates to a separator film for a device used for storing electrical energy, the film being porous and oriented.

Thus, the targeted applications are, for example, electric supercapacitors functioning either in an aqueous medium or in an organic medium, electric batteries, and particularly primary and secondary lithium-ion and -metal polymer batteries, as well as electrolytic capacitors.

The separator membranes used in electrical energy storage systems are of several types and are a function of the performance characteristics required.

In the case of supercapacitors, the most commonly used separator is made of cellulose. The characteristics sought are very high porosity, isotropy of the pores in the structure, good electrochemical and chemical stability with respect to the electrolytes used, thickness less than 35 µm and low deformation during its implementation in the component (winding, for example). Studies conducted recently clearly demonstrated that the separator is a potential source of supercapacitor aging: the supercapacitor gradually breaks down over time, reacts according to the polarity of the electrode (electrochemical aging) and generates gas. However, polymer-based separators pose several problems: they are either insufficiently porous (the case of separators proposed in the field of lithium-ion batteries, for example), or they are insufficiently stable electrochemically, or they are too deformable mechanically (plastic nature of polymers).

In the case of batteries functioning in an organic medium, such as, for example, lithium-ion batteries, the separator must be relatively thin (generally less than or equal to 25 µm), must not interact with organic electrolytes or with electrode components (especially lithium metal and lithium ions) and must tolerate high voltages (greater than 3 V), but at the same time it must ensure perfect electrical insulation between the two electrodes to avoid any risk of short-circuit. Separators developed for the field of lithium-ion batteries are generally produced from polyolefins by uniaxial cold-drawing with or without mineral filler. These separators generally have the disadvantage of poor mechanical resistance and of being highly deformable. To avoid the problems inherent in cold-drawing, which has the disadvantage of creating holes in the direction of the separator's thickness, one solution consists in carrying out a PP/PE/PP multilayer extrusion. This latter type of separator is particularly costly but has advantageous characteristics. Other types of separators, including ceramics, have also been developed for this type of application, but production costs are particularly limiting in terms of their broad industrial acceptance. Lastly, separators for polypropylene-based batteries using a beta-nucleating agent are known but they exhibit insufficient mechanical behavior because they contain only polypropylene.

In the field of lead-acid batteries, the separator generally used is made of glass fiber, essentially for reasons of resistance to corrosive aqueous electrolytes, but their performance is mediocre since this separator type is too thick (greater than 40 µm, generally) and the pores are too large (>5 µm). For this reason, separators combining mineral fillers and polyolefins have also been developed. Multilayer separators have also been developed in response to these problems. However, these separators also have problems of mechanical deformation during aging of the component and/or during their implementation.

In the case of electrolytic capacitors, the separator is generally made of cellulose for reasons of ease of impregnation. The operating principle of an electrolytic capacitor is as follows: first, if a current is circulated between two aluminum electrodes (anode and cathode) submerged in electrolyte (for example: boric acid solution), electrolysis causes the formation of a layer of aluminum oxide (alumina, $Al_2O_3$) on the surface of the anode. Second, alumina being an insulator, a capacitor whose dielectric is the layer of alumina is obtained, one electrode being constituted by the anode and the other by the electrolyte, the cathode serving only as a connection with the electrolyte. It is this dielectric insulator that makes it possible to make the dielectric considerably thinner in relation to the technology used in dielectric capacitors produced from polypropylene. Finally, the capacitor's capacity depends on the thickness of the layer of alumina as well as the surface of the electrodes. To increase the latter, it is possible to "etch" the anode by attacking it chemically before formation of the oxide layer. As a result, taking into account the operating voltage of these components (up to a few hundred volts), one or even several cellulose separators are added between the anode and the cathode. Nevertheless, the breakdown voltage of these separators is relatively low, from whence the occasional need to resort to several layers of separators. However, since polymer separators are generally not easily impregnable due to their structure, they cannot be used in this application. Taking into account the operating principle of this technology, it is evident that the cathode, which does not play an essential role in energy storage, constitutes a loss of volume and mass in the component. The thickness of this cathode sheet is generally between 15 µm and 60 µm and is also etched electrochemically to increase the surface in contact with electrolyte.

Polypropylene membranes produced from beta-nucleated precursors are known.

Generally, the nucleating agents used fall into three categories: either alkaline-earth carboxylates with relatively long chains such as, for example, more than ten successive linear carbons according to the document US-A-2005/212183; or metallic oxide nanoparticles such as, for example, according to the document EP-A-1511797 or calcium carbonate; or more complex organic molecules such as, for example, cyclic amides according to the document U.S. Pat. No. 7,235,203 or cyclic amines according to the document U.S. Pat. No. 3,563,971.

The document EP-B-492942 describes a porous and oriented film of a polymeric composition comprising:
(1) an ethylene-propylene component, component A, present at 5-95 parts by weight and being an ethylene-propylene block copolymer having an ethylene content of 10-50% by weight;
(2) a propylene component, made up of
  (i) 95-5 parts by weight of a component B, being a propylene homopolymer or random copolymer having up to 10% by weight of a comonomer of ethylene or an alpha-olefin of 4 to 8 carbon atoms,
  (ii) and optionally including up to 20 parts by weight, per 100 parts by weight of components A and B, of a component C, being a low molecular weight polypropylene homopolymer having a melt viscosity of 50-1000 poise measured at a shear rate of 136 $sec^{-1}$ at 190° C. and wherein component C may be provided by component B when component B has such a broad molecular weight distribution that the portion of component C required in the polymeric composition is included in the amount of low molecular weight material of component B;

(3) 0 to 30 parts by weight, per 100 parts by weight of components A and B, of a component B comprising calcium carbonate, and (4) 0 to 50 ppm, per 100 parts by weight of components A and B, of a component E comprising a nucleating agent producing beta-spherulites with the proviso that when the weight ratio of component A/component B is 5-30/95-70, component E is present at 0.1 to 10 ppm, and that when the weight ratio of component A/component B is 5-30/95-70, component C is present at:

(a) 5 to 20 parts by weight when the polymeric composition is substantially free of component D or components D and E, and (b) 1 to 10 parts by weight when the polymeric composition has 0.1 to 10 ppm of component E and 5 to 30 parts by weight of component D.

According to the document EP-B-492942, the porosity of such films is greater than 55% only for thicknesses of at least 25 microns. Thus, the examples 13-1, 13-2, 13-3 and 13-4 of the document EP-B-492942 provide a film obtained by stretching in a longitudinal direction and in a direction transverse to the longitudinal direction, a composition of 70% by weight of ethylene-propylene copolymer, 20% by weight of polypropylene/calcium carbonate to have 8% by weight of calcium carbonate in the composition, 10% by weight of low molecular-weight polypropylene and 2 ppm of red quinacridone dye, having a porosity of 59.8, 58.9, 59.2 and 62.2 for thicknesses of $5.6 \times 10^{-2}$ mm, $7.1 \times 10^{-2}$ mm, $6.9 \times 10^{-2}$ mm and $4.8 \times 10^{-2}$ mm, respectively. On the other hand, in Example 1e of a film obtained by stretching in a longitudinal direction and in a direction transverse to the longitudinal direction, a composition in unspecified proportions of an ethylene-propylene copolymer, a polypropylene homopolymer and 1.5 ppm of red quinacridone dye, porosity drops to 51.3% for a thickness of 19 microns, whereas the porosity for the same composition of Examples 1a, 1b, 1c and 1d is 58.0, 53.0, 58.4 and 56.2 for thicknesses of $3.94 \times 10^{-2}$ mm, $3.66 \times 10^{-2}$ mm, $3.30 \times 10^{-2}$ mm and $2.54 \times 10^{-2}$ mm, respectively.

The document EP-B-492942 mentions that the film disclosed therein can have a large number of applications, including as separators in electrochemical cells.

However, for the electrical applications indicated above, the film of the document EP-B-492942 has insufficient porosity for small thicknesses and does not have sufficiently good mechanical and thermal stability as a separator in an electrical energy storage device.

The document JP-A-2008 201814 provides, to have a porous polypropylene film with high permeability while maintaining productivity and mechanical strength and to have a battery device capable of reducing internal resistance, that the porous polypropylene film contains from 0.01% to 0.5% by weight of an amide compound based on polypropylene resin and 0.01% to 0.1% by weight of a quinacridone compound based on polypropylene resin.

The film of said document JP-A-2008 201814 has neither sufficiently good mechanical nor thermal stability for use as a separator in an electrical energy storage device.

The invention aims to obtain a film, as indicated above, that mitigates the disadvantages of the state of the art.

In particular, what is sought is a separator film suitable as a separator in a device used for storing electrical energy, such as, for example, the devices indicated above.

In particular, as a porous film, the film must have sufficiently low thermal shrinkage, since it will have to be able to undergo heating during its life in the device used for storing electrical energy, due to the simple fact of the use of the device for, for example, storing electrical energy, charging and discharging electrical energy, or due to the simple fact that a high maximum temperature prescribes the use of the device for storing electrical energy.

Moreover, the film must be able to be fabricated out repeated breaking.

The object of the present invention is the fabrication of a film produced by biaxial hot-drawing comprising a beta-nucleating agent, for energy storage applications.

A first subject matter of the invention is a separator film for a device used for storing electrical energy, the film being porous and oriented, and being obtained by stretching in a longitudinal direction and in a direction transverse to the longitudinal direction, the film containing a mixture comprising:

a polypropylene homopolymer,
at least 10% by weight of at least one copolymer of monomers comprising at least propylene and ethylene,
at least one beta-nucleating agent,
wherein the copolymer has an ethylene content greater than or equal to 1% and less than 10% by weight of the copolymer and a propylene content of at least 90% by weight of the copolymer for a micrometric thickness of the film greater than or equal to 8 microns and less than or equal to 30 microns, corresponding to a space factor determined according to the IEC-60674-3-1 standard greater than or equal to 145% and a density of the film stretched in both directions greater than or equal to $0.18$ $g/cm^3$ and less than or equal to $0.41$ $g/cm^3$.

According to one embodiment of the invention, the mixture comprises at least 50% by weight of said at least one copolymer of monomers comprising at least propylene and ethylene.

According to one embodiment, the copolymer has an ethylene content greater than or equal to 5%.

According to one embodiment, the space factor determined according to the IEC-60674-3-1 standard is greater than or equal to 150%.

According to one embodiment, the space factor determined according to the IEC-60674-3-1 standard is greater than or equal to 200%.

According to one embodiment of the invention, the beta-nucleating agent contains quinacridone.

According to one embodiment of the invention, the beta-nucleating agent consists of gamma-quinacridone.

According to one embodiment, the copolymer has an ethylene content greater than or equal to 5%.

According to one embodiment, the beta-nucleating agent consists of gamma-quinacridone in a proportion greater than or equal to 0.11% and less than or equal to 0.5% by weight.

According to one embodiment, the ethylene copolymer comprises butylene.

According to one embodiment, the proportion of butylene in the mixture is greater than zero and less than or equal to 1% by weight.

According to one embodiment, the micrometric thickness of the film is less than or equal to 25 microns.

According to one embodiment, the micrometric thickness of the film is less than or equal to 20 microns.

According to one embodiment, the film stretched in both directions has a surface density less than or equal to 0.400 g/cm² in both directions.

According to one embodiment, the film stretched in both directions has a Gurley porosity greater than or equal to 50 seconds and less than or equal to 300 seconds per 100 cm³.

According to one embodiment, the film stretched in both directions has a Gurley porosity greater than or equal to 80 seconds and less than or equal to 130 seconds per 100 cm³, and can notably be less than or equal to 120 seconds per 100 cm³.

According to one embodiment, the film stretched in both directions has a porosity in percent greater than or equal to 50%.

According to one embodiment, the film stretched in both directions has a porosity in percent greater than or equal to 55%, or to 60%.

According to one embodiment, the film has a breakdown voltage greater than or equal to 330 V/µm in micrometric thickness.

According to one embodiment, the film has a longitudinal modulus of elasticity greater than or equal to 600 MPa or 800 MPa according to the ASTM D882 standard.

According to one embodiment, the film has a transverse modulus of elasticity greater than or equal to 300 MPa according to the ASTM 9882 standard.

According to one embodiment, the film has a breaking strength greater than or equal to 20 MPa.

According to one embodiment, the mixture further comprises calcium stearate in a proportion of 25 to 250 mg/kg of mixture.

According to one embodiment, the transverse shrinking of the film of micrometric thickness less than or equal to 20 µm at 120° C. is less than 8%.

According to one embodiment of the invention, the transverse shrinking of the film of micrometric thickness 20 µm±1 µm at 120° C. is less than 8%.

According to one embodiment of the invention, the transverse shrinking of the film of micrometric thickness 20 µm±1 µm at 135° C. is less than 18%.

According to one embodiment of the invention, the transverse shrinking of the film of micrometric thickness 15 µm±1 µm at 120° C. is less than 7%.

According to one embodiment of the invention, for a temperature greater than or equal to 150° C., the film has a Gurley porosity greater than or equal to 5000 seconds.

A second subject matter of the invention is a method for fabricating the film as described above, wherein, during a first step said mixture being melt is passed on a chill roll (CR, 13), which rotates and which has a temperature less than the temperature of the mixture being melt to obtain a primary film (F), the primary film (F) is stretched in its longitudinal conveying direction (MD) during a second step after the first step, the film (F) is stretched in the direction transverse (TD) to the longitudinal direction (MD), the method being characterized in that during the first step, said mixture being melt has a time in contact with the chill roll (CR, 13) greater than or equal to 30 seconds, and notably greater than or equal to 85 seconds.

A subject matter of the invention is a method for fabricating a separator film for a device used for storing electrical energy, the film being porous and oriented, the film containing a mixture comprising:
a polypropylene homopolymer,
at least 10% by weight of at least one copolymer of monomers comprising at least propylene and ethylene,
at least one beta-nucleating agent,
wherein the copolymer has an ethylene content greater than or equal to 1% and less than 10% by weight of the copolymer and a propylene content of at least 90% by weight of the copolymer,
and wherein, during a first step said mixture being melt is passed on a chill roll (CR, 13), which rotates and which has a temperature less than the temperature of the mixture being melt to obtain a primary film (F), the primary film (F) is stretched in its longitudinal conveying direction (MD) during a second step after the first step, the film (F) is stretched in the direction transverse (TD) to the longitudonal direction (MD), the method being characterized in that during the first step, said mixture being melt has a time in contact with the chill roll (CR, 13) greater than or equal to 30 seconds.

According to one embodiment of the invention, during the second step, the film passes in a second longitudinal stretching entry zone (2) by second driving rolls (20) according to a speed of driving of the film (F) in the conveying longitudinal direction (MD), then the film (F) passes in a third longitudinal stretching exit zone (3) by third rolls (30) conveying the film (F) at a speed in the longitudinal conveying direction (MD) greater than the speed of driving of the film (F) on the second driving rolls (20) in the longitudinal conveying direction (MD), wherein the temperature of at least one of the second rolls (20) in the second longitudinal stretching entry zone (2) is greater than or equal to 45° C., and can notably be greater than or equal to 80° C., and is less than or equal to 110° C., and can notably be less than or equal to 100° C.

According to one embodiment of the invention, the temperature of at least one of the second rolls (20) in the second longitudinal stretching entry zone (2) is greater than or equal to 80° C. and is less than or equal to 110° C.

According to another embodiment of the invention, the temperature of at least one of the second rolls (20) in the second longitudinal stretching entry zone (2) is greater than or equal to 45° C. and is less than or equal to 100° C.

According to one embodiment of the invention, the chill roll (CR, 13) has a temperature greater than or equal to 110° C. and less than or equal to 145° C. for a mixture being melt having a temperature of 235 to 260° C. during the first step.

According to one embodiment of the invention, during the second step, the film passes in a second longitudinal stretching entry zone (2) by second driving rolls (20) according to a speed of driving of the film (F) in the longitudinal conveying direction (MD), then the film (F) passes in a third longitudinal stretching exit zone (3) by third rolls (30) conveying the film (F) at a speed in the longitudinal conveying direction (MD) greater than the speed of driving of the film (F) on the second rolls (20) in the longitudinal conveying direction (MD) to stretch the film in the longitudinal conveying direction (MD), wherein the transverse width reduction rate (NIR) of the film by longitudinal stretching between the second longitudinal stretching entry zone (2) and the third longitudinal stretching exit zone (3) is greater than or equal to 0.20, and can notably be greater than or equal to 0.28.

According to one embodiment of the invention, the film has a first face (F10) in contact with the chill roll (CR, 13) and a second face (F20) opposite to the first face (F10), wherein during the first step, an air knife having a temperature lower than the temperature of the chill roll (CR, 13) is passed on the second face (F20).

A third subject matter of the invention is an electrical supercapacitor, comprising at least two electrical conductors connected to at least two use terminals, wherein at least one porous separator film as described above and an electrolyte impregnating the film are between the two electrical conductors.

According to one embodiment of the invention, the electrical conductors are in a form wound with the porous film.

A fourth subject matter of the invention is a battery or cell for storing electrical energy, comprising at least two electrical conductors connected to at least two use terminals, wherein at least one porous separator film as described above and an electrolyte impregnating the film are between the two electrical conductors.

According to one embodiment of the invention, the electrical conductors are in a form wound with the porous film.

A fifth subject matter of the invention is an electrolytic capacitor, comprising an anode (A) and a cathode (CATH), between which is located at least one porous separator film as described above and an electrolyte impregnating the film.

According to one embodiment of the invention, the anode and the cathode are in a form wound with said at least one porous film.

According to one embodiment of the invention, cathode is formed by a metal deposition (M) on only one face of said at least one porous film. The metal deposition is carried out with or without plasma (ionized gas) pretreatment.

According to one embodiment of the invention, the anode and the cathode are in a form wound with said at least one porous film, the capacitor comprising at least one pair of said porous separator films (F1, each having on only one face the metal deposition forming the cathode, the metal depositions being one against the other, the anode being against one of the faces (F1) of one of said porous films not having a metal deposition.

According to one embodiment of the invention, the anode and the cathode are in a form wound with said at least one porous film, the capacitor comprising at least one pair, a first and a second, of said porous separator films (F1, F2), the first film having on only one face the metal deposition forming the cathode, the metal deposition of the first film being located against the second film not having a metal deposition, the anode being against one of the faces (F1) of one of said porous films not having a metal deposition.

The objective of the invention is also to improve the interaction (wettability) of the separator with aqueous solutions (acidic, basic or neutral).

The invention will be better understood upon consideration of the following description, given only as a nonrestrictive example in reference to the appended drawings, wherein.

Figure 3:
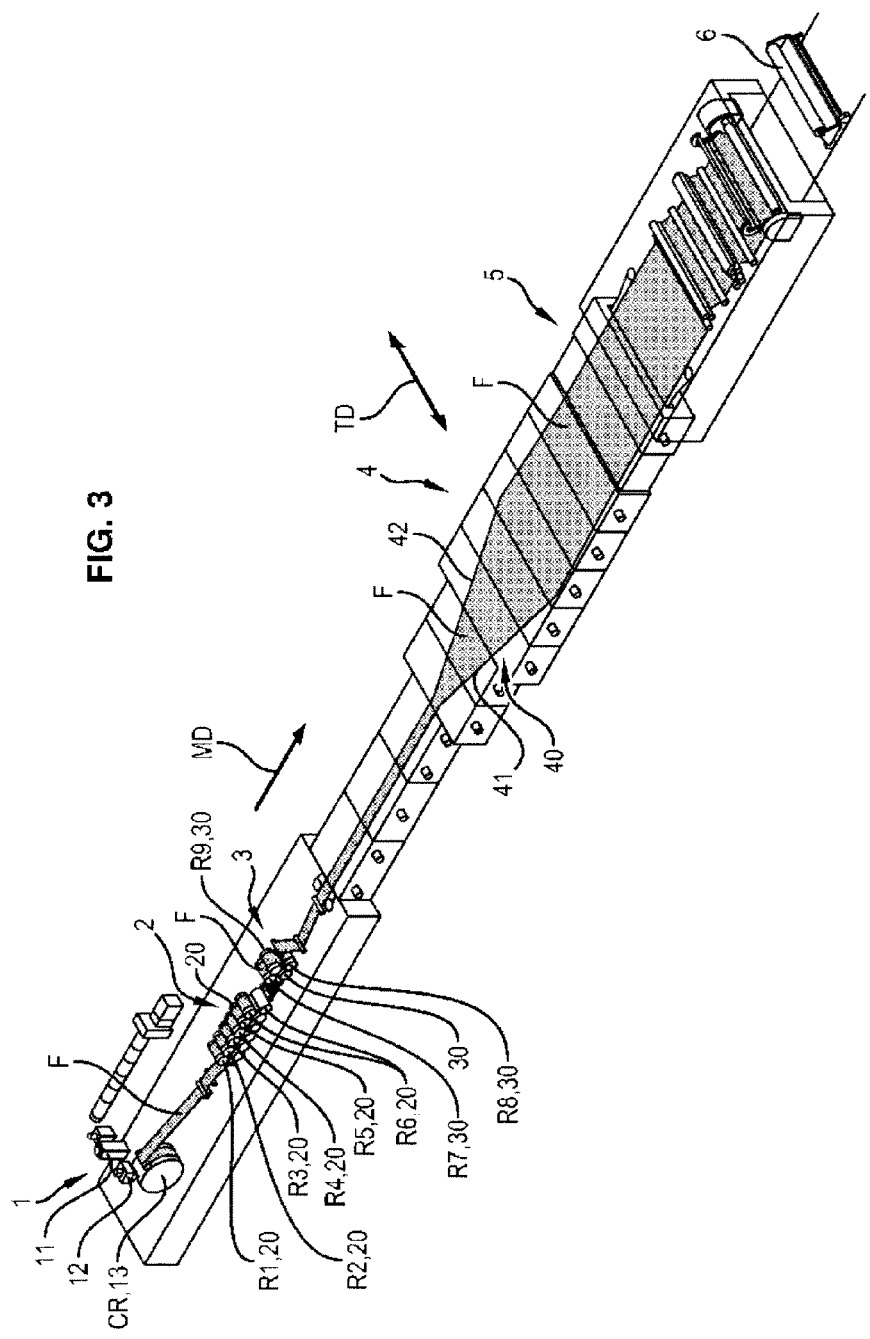
Figure 4:
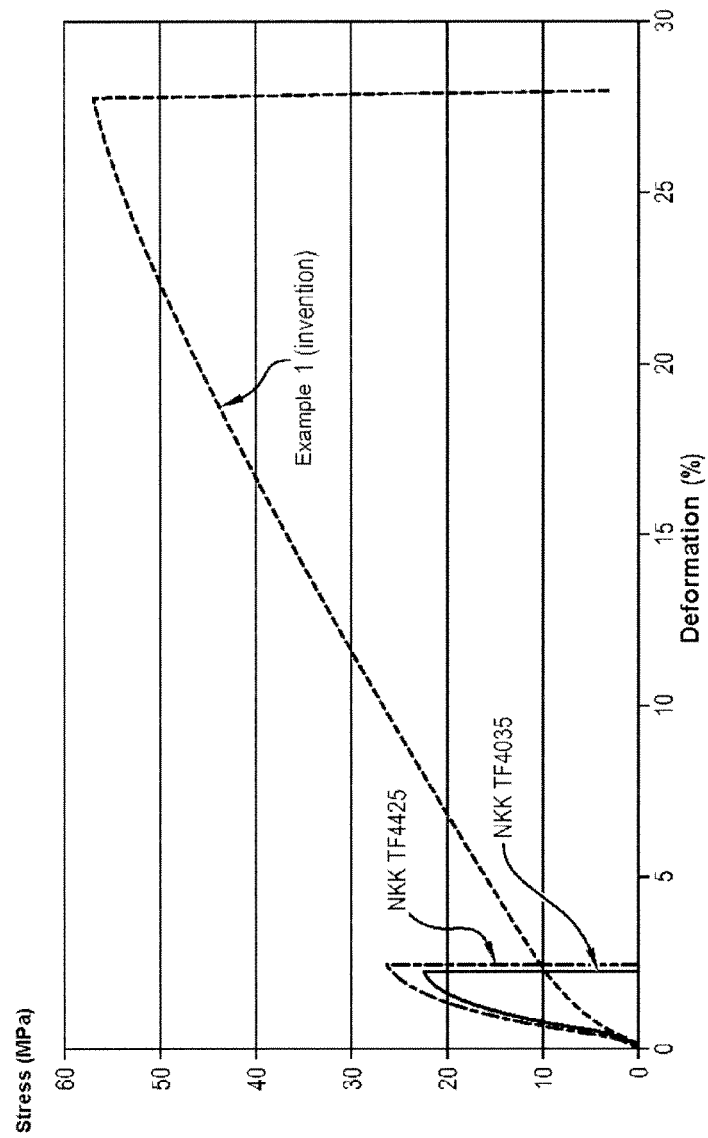
Figure 5:
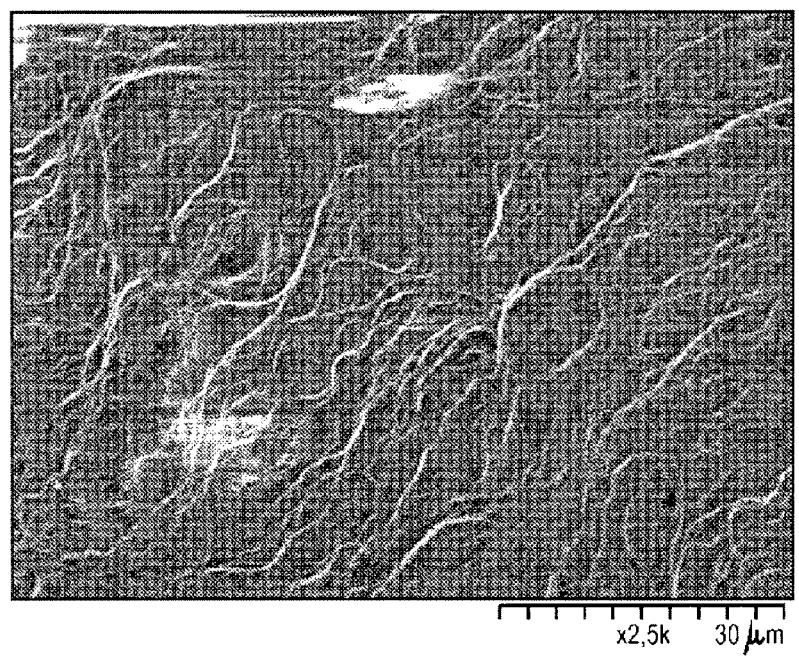
Figure 6:
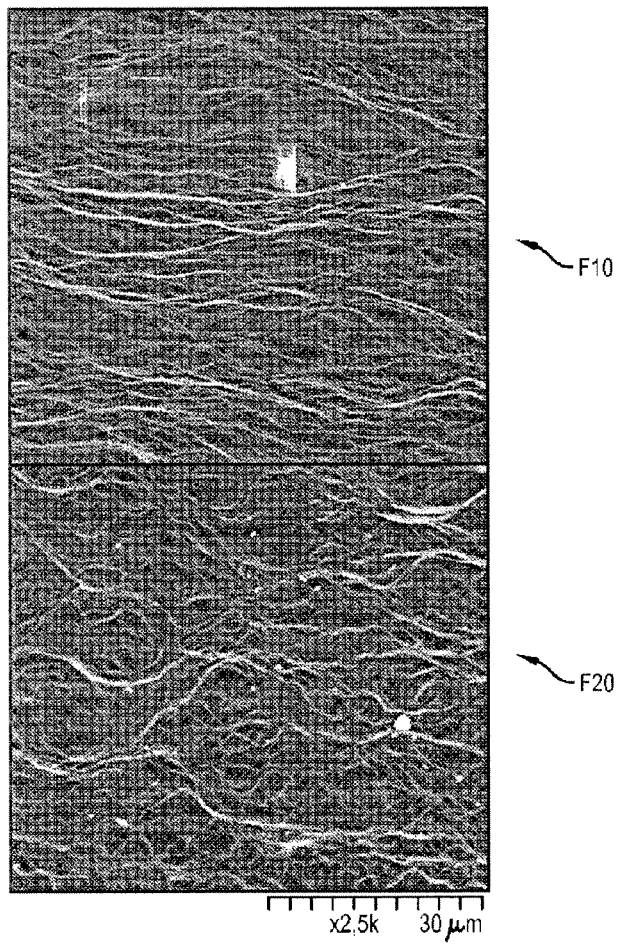
Figure 7:
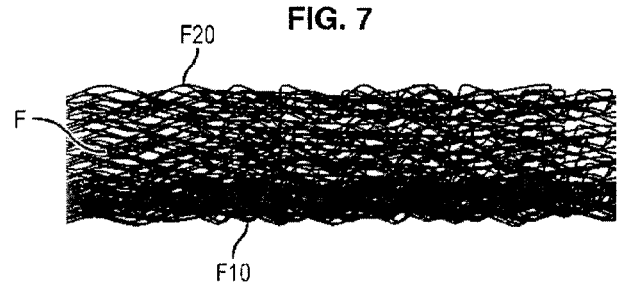
Figure 8:
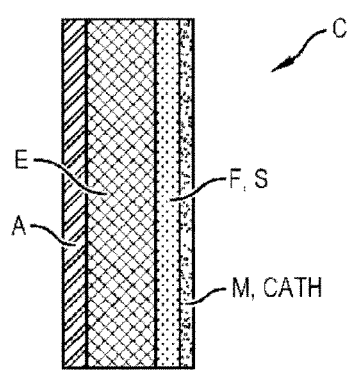
Figure 9:
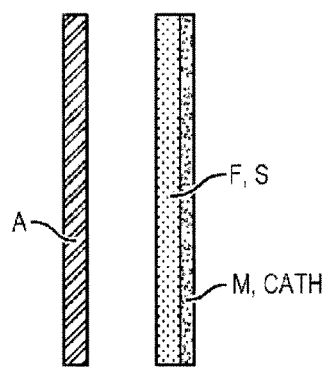
Figure 10:
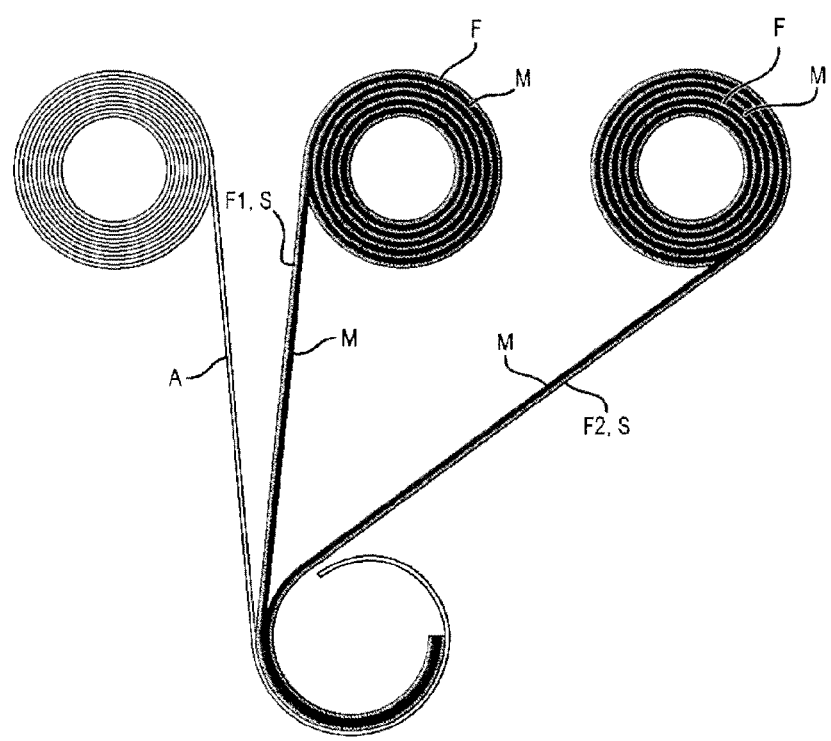
Figure 11:
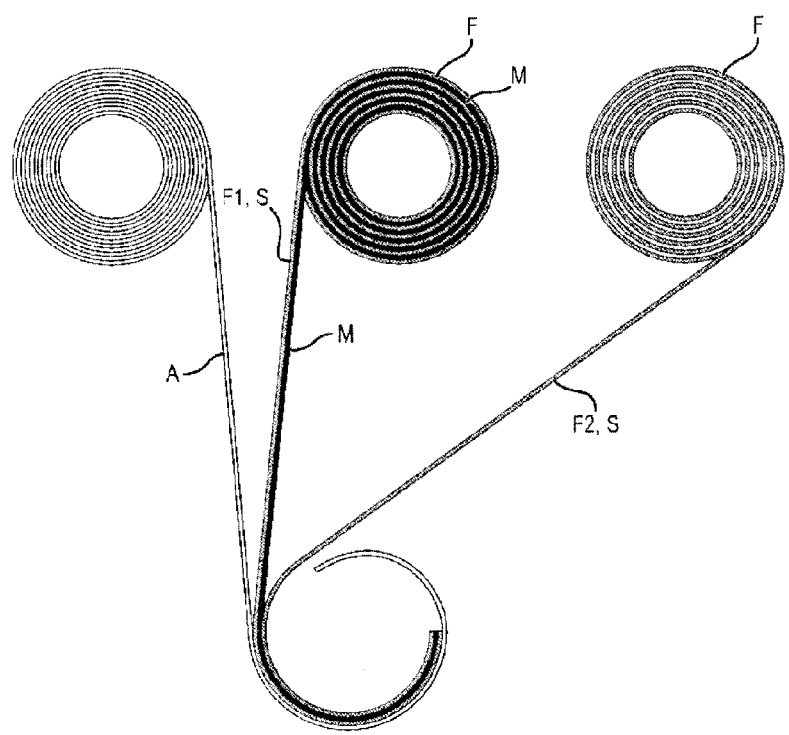
Figure 12:
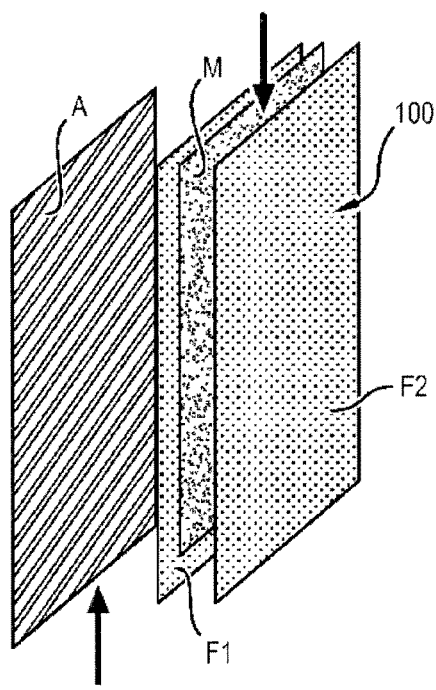
Figure 13:
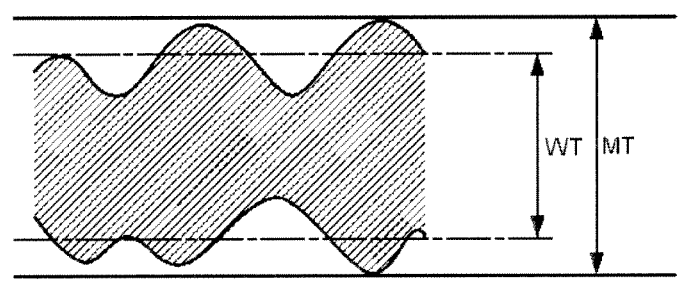
Figure 14:
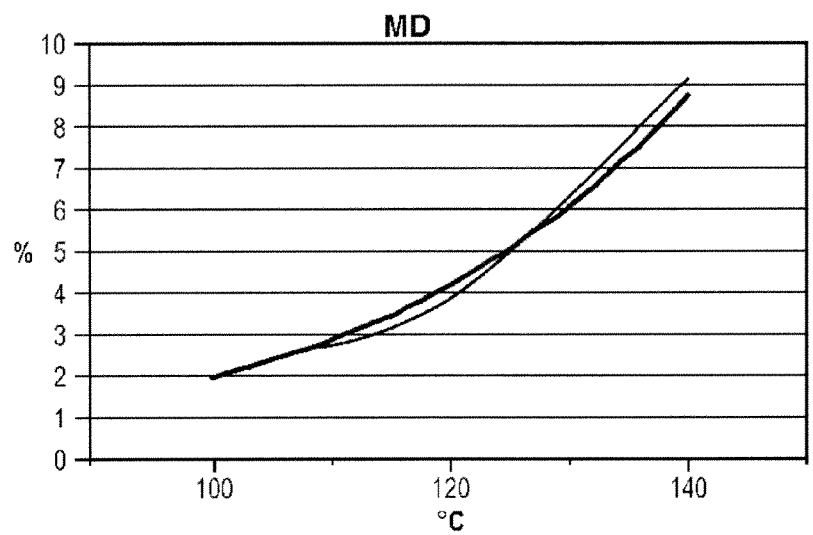
Figure 15:
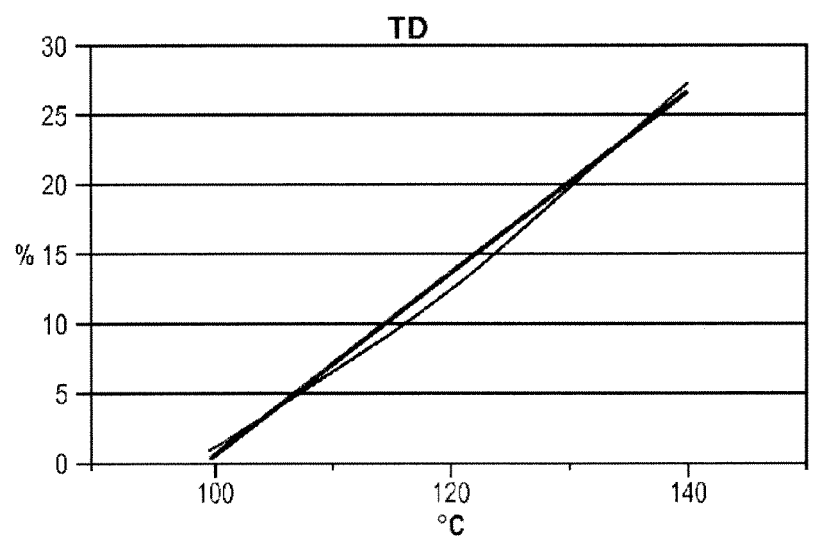
Figure 16:
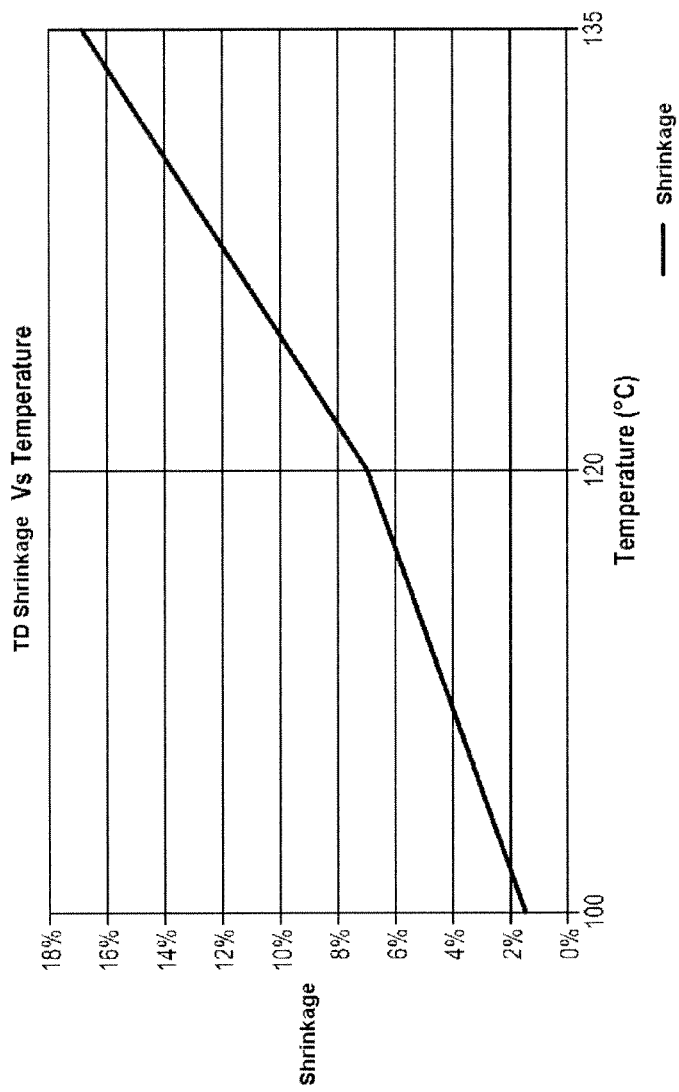
Figure 17:
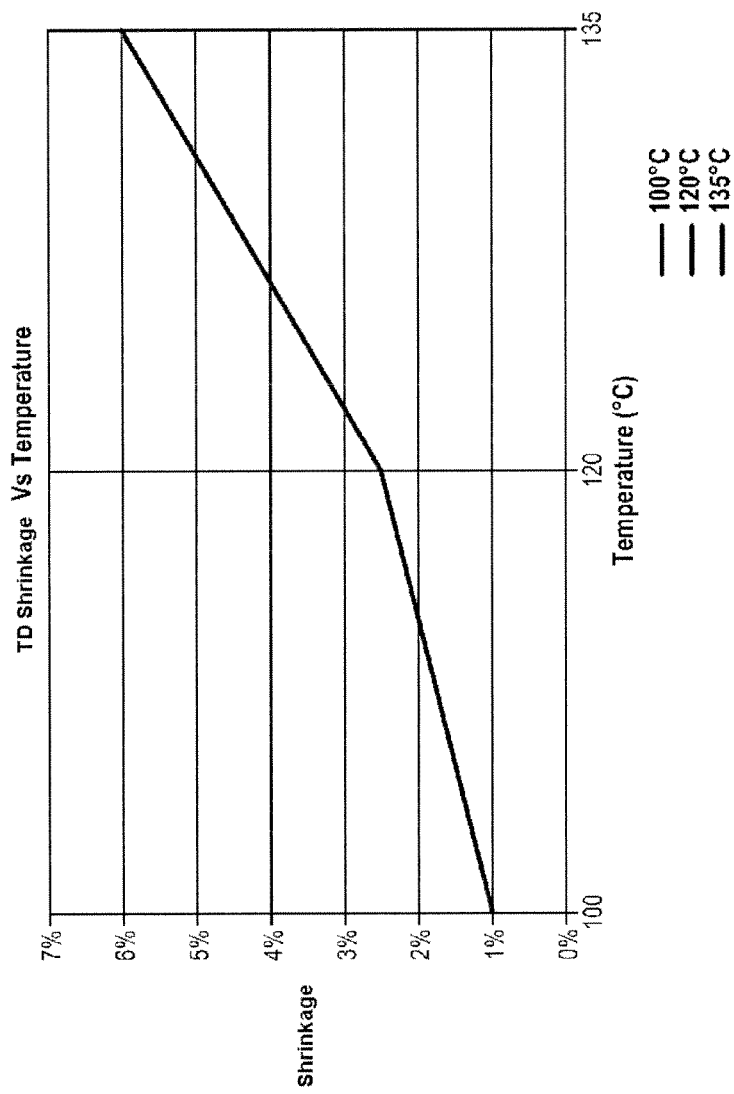
Figure 18:
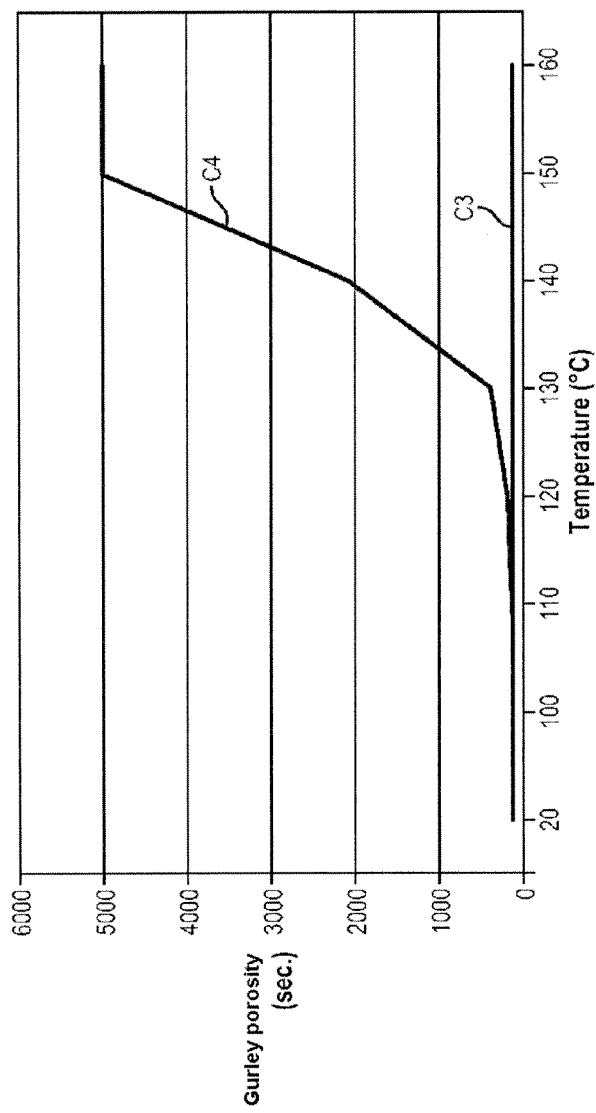

FIG. 3 is a perspective diagram representing a film production line of the invention, FIG. 4 is a diagram representing stress resistance during elongation of an example of film of the invention and two comparative examples, FIG. 5 is a scanning electron microscope view of an example of film of the invention, FIG. 6 is a scanning electron microscope view of the two faces of an example of film of the invention, FIG. 7 is a cross-sectional view illustrating the film of FIG. 6, FIG. 8 schematically represents the principle structure of an electrolytic capacitor, FIG. 9 schematically represents the principle structure of an electrolytic capacitor for its winding, FIG. 10 schematically represents the winding of an electrolytic capacitor of FIGS. 8 and 9 in a first embodiment, FIG. 11 schematically represents the winding of an electrolytic capacitor of FIGS. 8 and 9 in a second embodiment, FIG. 12 schematically represents a principle of current flow on the electrolytic capacitor produced according to FIG. 11, FIG. 13 represents a cross-sectional view of a polypropylene-based film, showing two types of film thicknesses, FIG. 14 is a graph representing film shrinkage according to one embodiment of the invention in the longitudinal direction as a function of temperature, FIG. 15 is a graph representing film shrinkage according to the same embodiment as FIG. 14 in the transverse direction as a function of temperature, FIG. 16 is a graph representing film shrinkage according to another embodiment of the invention in the transverse direction as a function of temperature, FIG. 17 is a graph representing film shrinkage according to the same embodiment as FIG. 16 in the longitudinal direction as a function of temperature, FIG. 18 is a graph representing a measurement of Gurley porosity in seconds as a function of temperature in one embodiment of the film.

In the example described below, a film containing simultaneously a polypropylene (PP) homopolymer, a polyethylene (PE) copolymer and a beta-nucleating agent, gamma-quinacridone, is produced.

The Inventors noticed that the combination of large space factor (Fe) and density interval of the film was determinant in order to be able to apply the film as a separator in an electrical energy storage device.

The space factor Fe of the film according to the invention is determined according to the IEC-60674-3-1 standard.

The space factor Fe of the inventive film is greater than or equal to 150%, and can notably be greater than or equal to 200%.

The density of the film according to the invention is greater than or equal to 0.18 g/cm$^3$ and less than or equal to 0.41 g/cm$^3$.

Space factor Fe is calculated using the following formula:

$$Fe\ (\%) = \frac{MT - WT}{WT} \times 100$$

wherein WT is gravimetric thickness or weighted thickness, MT is micrometric thickness.

FIG. 13 presents a schematic cross-sectional view of a polypropylene-based film, showing gravimetric thickness WT and micrometric thickness MT.

Micrometric thickness MT is the most commonly used and is the peak-to-peak thickness of the film, i.e., the distance between its highest and lowest peaks.

In contrast, gravimetric thickness WT is determined by weighing and is smaller than micrometric thickness MT.

Method for Determining a Film's Space Factor Fe

Space factor Fe, gravimetric thickness WT and micrometric thickness MT are determined in accordance with the IEC 60674-3-1 international standard.

A 12-layer sample of film is assembled, and an area of known size is cut out using a template. The sample is taken from a roll of film by cutting roughly 0.5 mm of film from the outside surface of the roll, and then cutting out 8 layers of film using the template. The template is 250 mm×500 mm.

Gravimetric thickness WT is determined using a weighing scale.

A micrometer is used to measure micrometric thickness MT. Micrometric thickness MT is measured with a flat active surface of 2 cm² and a force of 1.96 daN. To measure micrometric thickness MT, the first and last layers are eliminated to work with 8 layers. Ten individual measurements distributed on the surface of the sample are taken. Micrometric thickness MT is the average of these ten results.

Composition of the Film

Gamma-quinacridone as nucleating agent is present in a proportion less than 2% by weight of the mixture, notably: 0.1%<gamma-quinacridone<0.5%.

The copolymer is, for example, a terpolymer of propylene, ethylene and butylene.

In this copolymer, the proportion by weight of propylene is greater than or equal to 90% by weight of the copolymer.

In this copolymer, the proportion by weight of ethylene is greater than or equal to 1%, and can notably be greater than or equal to 5%, and is less than or equal to 10% by weight of the copolymer.

In this copolymer, the proportion by weight of butylene is greater than or equal to 0.01% and less than or equal to 1% by weight of the copolymer.

The mixture can further comprise calcium stearate, for example in a proportion of 25 to 250 mg/kg of mixture. Calcium stearate neutralizes the chlorine residues present in polypropylene when fabricated using a Ziegler-Natta catalyst, which is the case in the example embodiments below.

In one example embodiment, the polyethylene copolymer comprises roughly 9% polyethylene (PE). The following examples show that it is necessary to use both a PP homopolymer and a PE copolymer.

According to a first example embodiment of the invention, the composition of the film has the first composition C1 wherein the proportion by weight of ethylene is greater than or equal to 5% (by weight), as in, for example, tests 1 to 29 with the following composition C1:
polypropylene: ≥90% by weight of the mixture,
polyethylene: ~6.5% by weight of the mixture,
butylene: ~0.1% by weight of the mixture,
gamma-quinacridone: 0.2% by weight of the mixture.

Tests 1 to 29 below were carried out with a film having this first composition C1.

According to a second example embodiment of the invention, the composition of the film has the second composition C2 wherein the proportion by weight of ethylene is greater than or equal to 1% by weight and is less than or equal to 5% by weight, as in, for example, tests 30 to 44 and 101 to 110 with the following composition C2 indicated below:
polypropylene: ≥95% by weight of the mixture,
polyethylene: ~2% by weight of the mixture,
butylene: ~0.1% by weight of the mixture,
gamma-quinacridone: 0.2% by weight of the mixture.

Tests 1 to 110 below were carried out on a single-screw extruder from granular materials. The homopolymer produces a strong and resistant material. The copolymer has the advantage of giving a certain ductility to the material and thus a homogeneous film during stretching.

The materials used for the film in the tests were as follows:
ethylene copolymer: Clyrell EC310K from Basell,
homopolymer: dielectric grade PP resin HB311BF from Borealis,
beta-nucleating agent gamma-quinacridone in a masterbatch of PP:MP1113 (concentration of 2% gamma-quinacridone in the masterbatch) from Mayzo.

The percentage of formation of alpha and beta phases is a characteristic for obtaining a porous film created from polyolefins.

Figure 1:
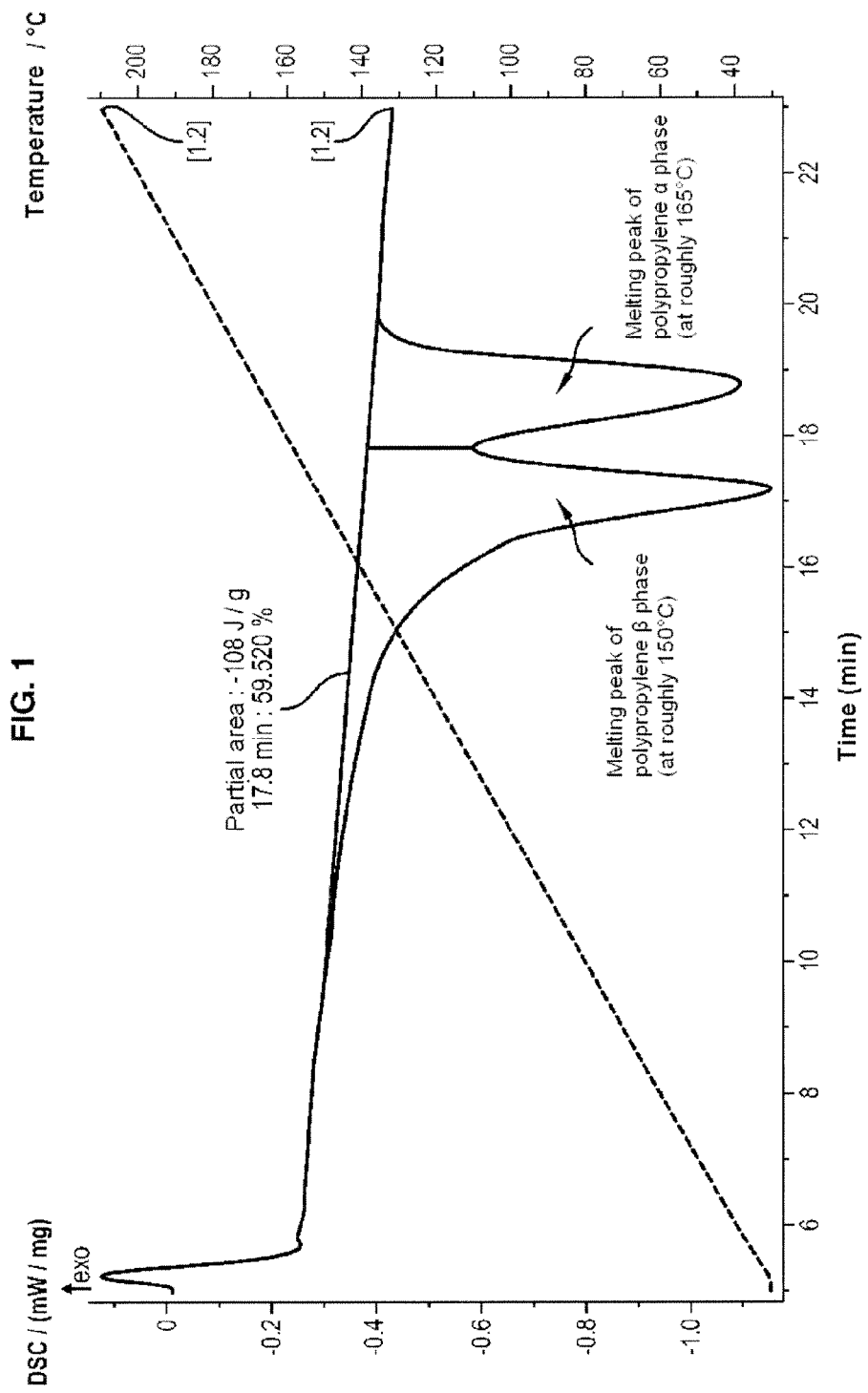
FIG. 1 represents a polypropylene melting curve.

Method for Determining the Quantity of Beta-Nucleated Phase in Relation to Alpha-Nucleated Phase For purposes of simplicity, this method is first described in reference to FIG. 1 in the case of a polypropylene film without ethylene copolymer. This measurement is made by integrating the melting curve prepared by differential scanning calorimetry (DSC) on the primary film obtained by extrusion according to FIG. 1. The primary film is obtained after polypropylene crystallization, recovered after the temperature-control rolls, i.e., just before longitudinal stretching. Since crystallization occurs from the exit of the die, on the chill roll (CR), it is thus essential to target the ideal kinetic and thermal parameters of the chill roll to obtain a primary film rich in β phase. The two most important parameters are thus chill roll temperature and rotation speed.

Integration of the entire melting curve of FIG. 1 gives the total crystallinity of the polymer. The enthalpy measured is expressed as: $\Delta H = (\Delta H_\alpha + \Delta H_\beta)$ (in J/g). To estimate the percentage of β phase formed, partial integration is possible.

In the case of FIG. 1, the value 59.5% corresponds to the area delimited by the curve and the baseline to the left of the vertical mark. It is the percentage of β phase created during crystallization. The ratio of the beta-nucleated phase is expressed as: % beta of PP=100%×[area of beta peak/(area of alpha peak+area of beta peak)].

In FIG. 1, the polypropylene (primary film) was heated at a rate of 10° C./min until its melting point was exceeded.

Figure 2:
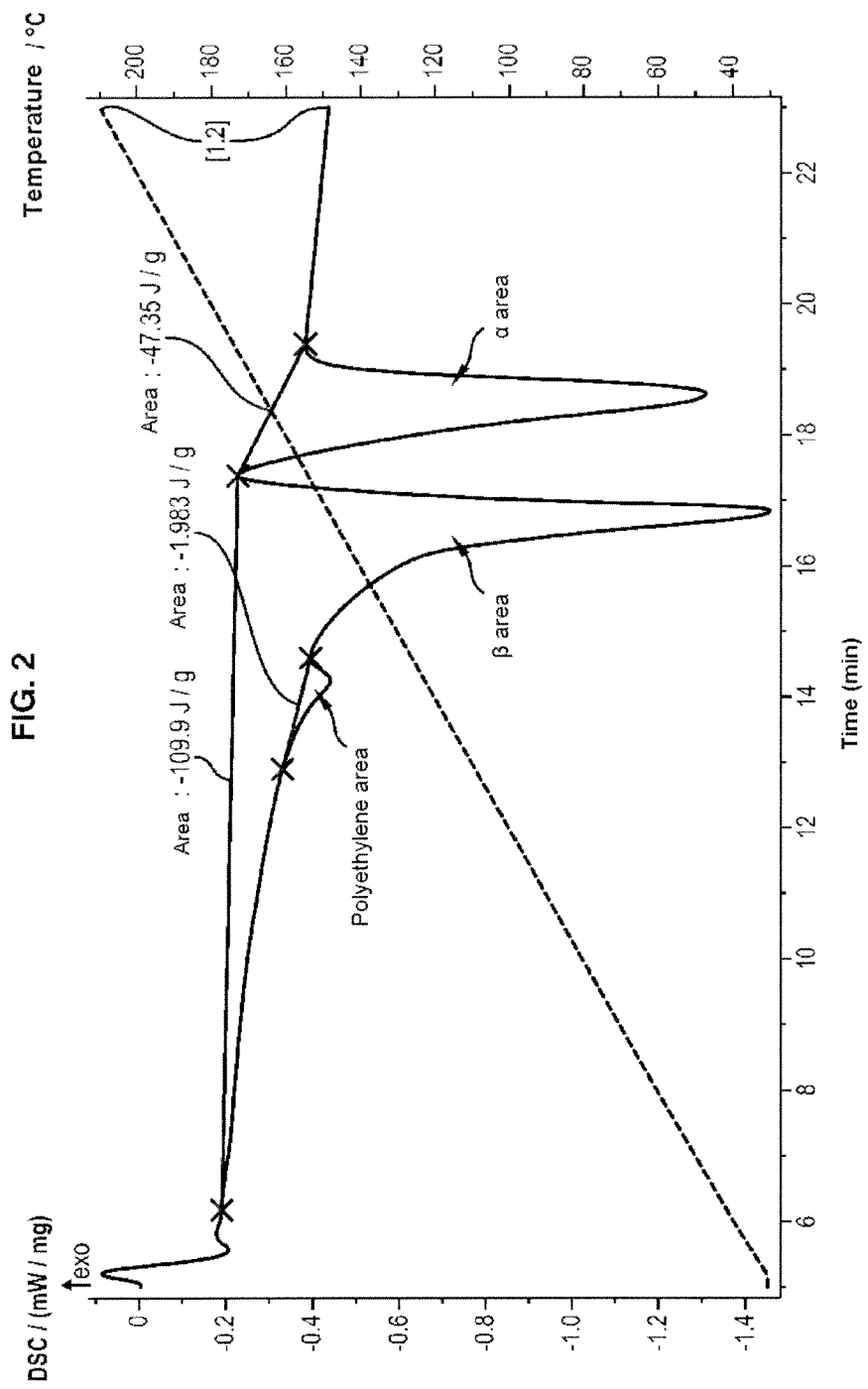
FIG. 2 represents a polyethylene and polypropylene melting curve.

In the case of a polyolefin (PP+PE) mixture in FIG. 2 of the invention, the determination is made according to the same method as in FIG. 1, by integrating the additional peak easily attributable to PE (FIG. 2).

The film fabrication method of the invention, in reference to FIG. 3, is described below.

Fabrication of the film F of the invention moves successively through a first casting zone 1, a second longitudinal stretching entry zone 2, a third longitudinal stretching exit zone 3 and a fourth transverse stretching zone 4.

In the first casting zone 1, the mixture of materials of the invention is first placed in an extruder 11 to arrive in the molten state by a die 12 on the chill roll 13 to form the primary film F.

The primary film F in zone 1 has the following characteristics:
thickness: 275±25 μm,
β crystal ratio at the primary film exit (before longitudinal stretching): ≥60% (measured by DSC–area methods indicated above), notably ≥65% and in particular ≥75%.

Temperature of Chill Roll 13 (Cooling Rate)

It turns out that crystallization must be as slow as possible to form the β phase. Since the domain of formation of β crystals is known, i.e., between 90 and 130° C., the most relevant tests are obtained in this temperature range. The ideal temperature for β phase formation was between 120 and 130° C.

Rotation Speed of Chill Roll 13

The rotation speed of chill roll 13 plays a part in two quite distinct phenomena, namely crystallization time and the orientation of material exiting the die. While becoming oriented, the material comes together in its stable α form due to the stress applied. If the chill roll 13 turns quickly in relation to the flow of material leaving the die 12, the material is thusly oriented. The speed at which the material leaves the die 12 can, however, be modified by adjusting the pressure within the die 12, without having to modify the flow rate.

According to the invention, porosity is increased due to the fact that the time of contact between the molten material and the chill roll 13 is at least 30 seconds.

For example, in tests 1 to 29 below, the time of contact between the melt and the chill roll 13 is roughly 40 seconds. For example, in the first example embodiment indicated above, the linear speed of the chill roll 13 is less than 3 meters per minute and is, for example, 2 meters per minute for a contact time of 40 seconds.

In the second example embodiment indicated above, the time of contact between the melt and the chill roll 13 is greater than or equal to 85 seconds. For example, in tests 30 to 44 and 101 to 110 below, the time of contact between the melt and the chill roll 13 is roughly 110 seconds. For example, in the second example embodiment indicated above, the linear speed of the chill roll 13 is less than 1 meter per minute and is, for example, 0.6 meters per minute for a contact time of 115 seconds.

One such contact time according to the invention improves pore formation in the film. Porosity is also increased by the temperature of the mixture in melt state: from 235 to 260° C.

The parameters in casting zone 1 are, for example, as follows in the first example embodiment indicated above:
temperature of the mixture in melt state: 235 to 260° C.,
contact time on the chill roll CR, 13: 40±10 seconds,
temperature of the chill roll CR, 13: 110 to 145° C.,
pressing and cooling by air knife or without.

The parameters in casting zone 1 are, for example, as follows in the second example embodiment indicated above:
temperature of the mixture in melt state: 235 to 260° C.,
contact time on the chill roll 13 (CR): 110±10 seconds,
temperature of the chill roll 13 (CR): 110 to 145° C.,
pressing and cooling by air knife or without.

In the second longitudinal stretching entry zone 2, the primary film F from the chill roll 13 is conveyed between the rolls 20 in a longitudinal or machine direction MD corresponding to the direction of conveying of the film.

The temperature of the driving rolls 20 in the second longitudinal stretching entry zone 2 is, for example, 80 to 100° C. in the first example embodiment and in tests 1 to 29 and is, for example, 50 to 90° C. in the second example embodiment and in tests 30 to 44 and 101 to 110, at least for the first rolls 20, R1, R2, R3, R4, R5 in the direction MD of conveying of the film, these first rolls 20, R1, R2, R3, R4, R5 having, for example, the same temperature.

This temperature of the first rolls 20, R1, R2, R3, R4, R5 improves the formation of pores in the film.

The last roll 20, R6 in the direction MD of conveying of the film has, for example, a temperature greater than that of the first rolls 20, R1, R2, R3, R4, R5, for example equal to roughly 115° C. in tests 1 to 29 and roughly equal to 100° C. in tests 30 to 44 and 101 to 110.

In the third longitudinal stretching exit zone 3, the film F passes between the longitudinal stretching rolls 30, due to the fact that the stretching rolls 30 advance the film at a greater speed in the exit zone 3 than in the entry zone 2, for example by having a higher rotation speed, which stretches the film F in the machine direction MD between the second zone 2 and the third zone 3. The film passes on successive rolls R7, R8 and R9, which are rolls 30.

The parameters in the third longitudinal stretching exit zone 3 are as follows:
(speed in zone 3/speed in zone 2)≥5.5,
NIR≥0.20, or even 0.28, 0.29 or 0.30, with NIR=(film width in zone 2−film width in zone 3)/film width in zone 2,
temperature of the longitudinal stretching rolls 30: 50° C. to 150° C., and in the first example embodiment (Tests 1 to 29) 100° C. to 150° C., and, in the second and third example embodiments (Tests 30 to 44 and 101 to 110), 50° C. to 100° C.

The parameter referred to as NIR is the rate of reduction in width by longitudinal stretching, the width being in the transverse direction TD relative to the longitudinal direction MD.

The effect of this reduction in width is to orient the film's micropores in the longitudinal direction but also to pack them in a narrower width to thus make it possible during transverse stretching to stretch these micropores perpendicularly, i.e., to widen them. This method thus increases porosity and distributes porosity more uniformly in the film. To achieve porosity values relevant to the applications concerned, this reduction rate must be at least 20%, and can notably be at least 28%.

The distance between the longitudinal stretching rolls 20 and 30 is directly related to NIR rate. Moreover, a large stretching surface (Transverse stretching TD×longitudinal stretching MD) reduces the film's density.

In the fourth transverse stretching zone 4, the film F from zone 3 is stretched in the transverse direction TD perpendicular to its longitudinal direction MD in the plane of the film, while continuing to advance in this same longitudinal direction MD. To this end, the film is gripped on its two opposing longitudinal edges 41, 42 in zone 4 by grips (not represented) according to a trajectory 40 that advances in the longitudinal direction MD and which gradually moves apart the edges 41, 42 of the film in the transverse direction TD. The transverse stretching temperature in zone 4 is 120 to 170° C. in the first example embodiment (Tests 1 to 29), 130 to 152° C. in the second example embodiment (Tests 30 to 44) and 135 to 149° C. in the third example embodiment (Tests 101 to 110). The transverse stretching ratio in the transverse stretching zone 4 is, for example, greater than or equal to 4 or even 6.

The film F then undergoes in a zone 5 a slight relaxation which slightly decreases the transverse width of the film, which could then, for example, be wound on a core 6 for future use.

On a biaxially-stretched film F fabricated with the first composition C1 under the fabrication conditions indicated above for the first tests 1 to 29, the following characteristics were measured with the accuracy indicated in parentheses:
space factor: 217% (±12%),
micrometric thickness: 20 µm (±6 µm),
density: 0.285 g/cm$^3$ (±0.025 g/cm$^3$),
porosity: 65% (±10%),
Gurley porosity: 100 seconds per 100 cm$^3$ (±15 seconds per 100 cm$^3$).

On another biaxially-stretched film F fabricated with the second composition C2 under the fabrication conditions indicated above for the second Tests 30 to 44 (film 009P015), the following characteristics were measured:
space factor: 203% (±11%),
micrometric thickness: 20 µm (±2 µm),
density: 0.299 g/cm$^3$ (±0.01 g/cm$^3$),
porosity: 67% (±1%),
Gurley porosity: 119 seconds per 100 cm$^3$ (±23).

Determination of Porosity in Percentage

Porosity in % is determined by density by the following formula:

$$\text{porosity} = 1 - (X/Y)$$

wherein Y is the density of the polypropylene homopolymer used and X is the density of the film. Percentage of porosity is calculated by multiplying by 100. For example, in the example mentioned above, Y=0.905 g/cm³ and the total porosity of the film is obtained by the following formula:

$$\text{porosity}(\%) = (1 - (X/0.905)) \times 100$$

Tables 1, 2, 3 and 4 below present 10 tests of films fabricated according to the invention, wherein T indicates temperature. The tests appearing in these tables are Tests 1 to 10, carried out under the conditions presented above.

TABLE 1

| Test | Screw extruder Melting temperature (° C.) | Die Temperature (° C.) | Chill roll CR Temperature (° C.) | Chill roll CR Speed (meters/min) |
|---|---|---|---|---|
| Test 1 | 235 | 240 | 125 | 2 |
| Test 2 | 234 | 240 | 125 | 2 |
| Test 3 | 234 | 240 | 125 | 2 |
| Test 4 | 234 | 240 | 125 | 2 |
| Test 5 | 234 | 240 | 125 | 2 |
| Test 6 | 234 | 240 | 125 | 2 |
| Test 7 | 244 | 255 | 125 | 2 |
| Test 8 | 247 | 255 | 125 | 2 |
| Test 9 | 247 | 255 | 125 | 2 |
| Test 10 | 247 | 255 | 125 | 2 |

TABLE 2

| Long. stretching MD | T R1 (° C.) | T R6 (° C.) | Long. stretch ratio MD | NIR | T R7 (° C.) | T R8 (° C.) | T R9 (° C.) |
|---|---|---|---|---|---|---|---|
| Test 1 | 100 | 115 | 5.3 |  | 120 | 140 | 140 |
| Test 2 | 90 | 115 | 4.4 | 0.35 | 120 | 135 | 135 |
| Test 3 | 90 | 115 | 6 | 0.32 | 120 | 135 | 140 |
| Test 4 | 90 | 115 | 6 | 0.32 | 120 | 135 | 140 |
| Test 5 | 90 | 115 | 6 | 0.32 | 120 | 135 | 140 |
| Test 6 | 90 | 115 | 6 | 0.31 | 120 | 140 | 135 |
| Test 7 | 90 | 115 | 6 | 0.31 | 115 | 140 | 125 |
| Test 8 | 90 | 115 | 5.4 | 0.29 | 115 | 140 | 125 |
| Test 9 | 90 | 115 | 5.9 | 0.28 | 115 | 140 | 125 |
| Test 10 | 90 | 115 | 5.6 | 0.28 | 115 | 140 | 125 |

TABLE 3

| Transverse (TD) stretching | Temperature (° C.) | Transverse stretching ratio |
|---|---|---|
| Test 1 | 145 | 6.5 |
| Test 2 | 145 | 7.5 |
| Test 3 | 145 | 7.5 |
| Test 4 | 145 | 7.5 |
| Test 5 | 145 | 7.5 |
| Test 6 | 145 | 7.5 |
| Test 7 | 145 | 7 |
| Test 8 | 145 | 7.5 |
| Test 9 | 145 | 7.5 |
| Test 10 | 145 | 7.5 |

TABLE 4

| Final film | Micrometric thickness (μm) | Density (g/cm³) | Proportion ethylene copolymer/PP homopolymer by weight | Proportion β phase in % |
|---|---|---|---|---|
| Test 1 | 80.7 | 0.342 | 70/30 | 71.3 |
| Test 2 | 37.0 | 0.378 | 70/30 | 71.0 |
| Test 3 | 27.2 | 0.328 | 80/20 | 70.7 |
| Test 4 | 29.9 | 0.321 | 65/35 | 70.7 |
| Test 5 | 29.0 | 0.321 | 60/40 | 69.7 |
| Test 6 | 19.4 | 0.408 | 70/30 | 61.8 |
| Test 7 | 43.2 | 0.275 | 70/30 | 69.6 |
| Test 8 | 27.81 | 0.299 | 65/25 | 77.0 |
| Test 9 | 24.80 | 0.291 | 98/2 | 77.8 |
| Test 10 | 25.87 | 0.270 | 70/30 | 78.3 |

Test 6 is regarded as having a porosity of practically 55% according to the inventive formula indicated above.

In other tests 21, 22, 23, 25, 26, 29, the film fabrication method of the invention was implemented with the following parameters:

melting point: 246° C., except for Test 29 at 250° C., chill roll (CR) temperature: 120° C.; chill roll (CR) speed: 2 meters per minute, temperature of the first rolls 20, R1, R2, R3, R4, R5: 90° C., temperature of the last roll 20, R6: 115° C., longitudinal stretching ratio MD: 5.1, except for Test 29: 5.2,

T R7=115° C., T R8=140° C., T R9=125° C.,

The transverse stretching conditions are given in Tables 5, 6 and 7 below, wherein TZ1, TZ2, TZ3, TZ4, TZ5 and TZ6 are, respectively, the temperatures in six successive zones of a transverse stretching tunnel having as gaps of the chains supporting the grips holding the edges of the film the spacing distances DZ1, DZ2, DZ3, DZ4, DZ5, DZ6, expressed in cm, wherein TD designates the transverse stretching ratio, Copol/PP homo designates the proportion of ethylene copolymer/PP homopolymer by weight and wherein β designates the proportion of β phase in % determined according to the area methods indicated above.

TABLE 5

| Test | TZ1 (° C.) | TZ2 (° C.) | TZ3 (° C.) | TZ4 (° C.) | TZ5 (° C.) | TZ6 (° C.) |
|---|---|---|---|---|---|---|
| 21 | 147 | 147 | 147 | 150 | 155 | 155 |
| 22 | 150 | 150 | 150 | 150 | 155 | 155 |
| 23 | 150 | 150 | 150 | 150 | 160 | 160 |
| 25 | 145 | 145 | 145 | 150 | 165 | 165 |
| 26 | 150 | 150 | 150 | 150 | 155 | 155 |
| 29 | 147 | 147 | 147 | 150 | 155 | 155 |

TABLE 6

| Test | DZ1 | DZ2 | DZ3 | DZ4 | DZ5 | DZ6 | TD |
|---|---|---|---|---|---|---|---|
| 21 | 150 | 140 | 600 | 740 | 720 | 700 | 7.5 |
| 22 | 150 | 140 | 600 | 740 | 720 | 700 | 7.5 |
| 23 | 150 | 140 | 600 | 740 | 720 | 700 | 7.5 |
| 25 | 150 | 140 | 600 | 740 | 720 | 700 | 7.5 |
| 26 | 150 | 140 | 600 | 740 | 720 | 700 | 7.5 |
| 29 | 150 | 140 | 600 | 740 | 720 | 700 | 7.5 |

TABLE 7

| Test | Gravimetric thickness MT (μm) | Micrometric thickness WBT (μm) | Space factor Fe (%) | Density (g/cm³) | Copol/PP homo | β (%) |
|---|---|---|---|---|---|---|
| 21 | 8.6 | 26.4 | 209 | 0.293 | 70/30 | 78.5 |
| 22 | 8.3 | 25.5 | 206.4 | 0.295 | 70/30 | 78.0 |
| 23 | 8.1 | 24.8 | 205.9 | 0.296 | 70/30 | 78.3 |
| 25 | 8.5 | 25.8 | 204.5 | 0.297 | 70/30 | 77.8 |
| 26 | 6.9 | 21 | 204 | 0.298 | 70/30 | 77.6 |
| 29 | 7.9 | 23.9 | 204.3 | 0.297 | 70/30 | 77.7 |

In the second series of tests 30 to 44 (Table 8), the film fabrication method of the invention was implemented with the following parameters:

melting point: 244 to 248° C.,
temperature of the chill roll CR: 125° C.; speed of the chill roll CR: 0.6 meters per minute,
temperature of the first rolls 20, R1, R2, R3, R4, R5 between 50° C. and 90° C.,
temperature of the last roll 20, R6: 100° C.,
longitudinal stretching ratio MD: 5.7
T R7=100° C., T R8=50° C., T R9=70° C.,
TZ1=147° C. except for Test 30 in which TZ1=148° C.,
TZ2=150° C., except for Test 33 in which TZ2=151° C.,
TZ3=151° C. except for Tests 30 and 31, in which TZ3=150.5° C. and for Test 33 in which TZ3=151.5° C.,
TZ4=146° C. except for Test 32 in which TZ4=147° C.,
TZ5=140° C. except for Tests 33, 34 and 35, in which TZ5=135° C.,
TZ6=140° C. except for Tests 33 and 34, in which TZ6=130° C.,
NIR: 0.28,
proportion of β phase: ≥70%,
Gurley porosity POR1 is expressed in seconds per 100 cm³,
Gurley porosity after oven POR2 is measured in seconds per 100 cm³ after spending 20 minutes in a 120° C. oven,
Transverse shrinkage TD was measured at 120° C., the heating time at the indicated temperature being 15 minutes each time.

TABLE 8

| Test | MT (μm) | Fe (%) | Density (g/cm³) | Copol/PP homo | Gurley porosity POR1 | Transverse shrinkage (%) | Gurley porosity after oven POR2 |
|---|---|---|---|---|---|---|---|
| 30 | 20.8 | 203.2 | 0.298 | 20/80 | 111 | 7.23 | 175 |
| 31 | 20.4 | 213.6 | 0.289 | 20/80 | 114 | 6.65 | 175 |
| 32 | 20.0 | 204 | 0.298 | 20/80 | 95 | 7.09 | 150 |
| 33 | 22.1 | 206.8 | 0.295 | 20/80 | 121 | 7.46 | 190 |
| 34 | 20.9 | 193.9 | 0.308 | 20/80 | 115 | 7 | 175 |
| 35 | 21.4 | 197.2 | 0.305 | 20/80 | 122 | 6.12 | 180 |
| 36 | 20.6 | 202.5 | 0.299 | 20/80 | 119 | 5.66 | 170 |
| 37 | 20.0 | 200.9 | 0.301 | 20/80 | 123 | 6.56 | 185 |
| 38 | 20.1 | 205.7 | 0.296 | 20/80 | 123 | 6.43 | 180 |
| 39 | 19.2 | 202.2 | 0.300 | 20/80 | 116 | 5.07 | 165 |
| 40 | 19.9 | 205.9 | 0.296 | 20/80 | 125 | 5.82 | 175 |
| 41 | 20.6 | 203.6 | 0.298 | 20/80 | 122 | 6.25 | 180 |
| 42 | 20.6 | 203.5 | 0.298 | 20/80 | 121 | 5.63 | 170 |
| 43 | 20.0 | 202.9 | 0.299 | 20/80 | 119 | 6.97 | 175 |
| 44 | 20.5 | 196.3 | 0.305 | 20/80 | 122 | 6.48 | 180 |

Furthermore, in Tests 30 to 44, for the film according to the second embodiment of the invention, having a micrometric thickness less than or equal to 20 μm (or 21 μm) or micrometric thickness of 20 μm±1 μm has a Gurley porosity greater than or equal to 5000 seconds at 150° C., as is represented in FIG. 18, wherein curve C3 represents the value of the Gurley porosity POR1 in seconds and wherein curve C4 represents the value of said Gurley porosity measured in seconds as a function of temperature. It is seen that up to roughly 110° C., the real Gurley porosity C4 in seconds of the film is equal to POR1 and is thus minimal in seconds, which represents a highly porous film. The higher the temperature above 110° C., the higher the measured Gurley porosity value in seconds C4, which represents a less and less porous film as temperature increases. Above 150° C., the measurement of Gurley porosity C4 has a plateau equal to 5000 seconds, due to the fact that the measuring device has a range of 0 seconds to 5000 seconds. Consequently, for a temperature greater than or equal to 150° C., the Gurley porosity is greater than or equal to 5000 seconds. For said Gurley porosity greater than 5000 seconds starting at 150° C., the film's pores are practically closed, which is an advantageous behavior of self-protection in the applications concerned. Indeed, when the film is used in an energy storage device, this closing of pores at 150° C. and above 150° C. makes it possible to stop the energy storage device at this temperature, because the film is no longer acting as a separator and no longer allows electrochemical species to pass through it. At these high temperatures, this protects the energy storage device in which the film is contained and avoids deterioration of the energy storage device. On the other hand, up to 110° C., the film acts as a separator by allowing electrochemical species to pass and by having the Gurley porosity value POR1, which is its nominal value of operation as a separator film in an energy storage device and which thus enables the operation of the energy storage device.

In a third series of tests 101 to 110 (Table 9), the film fabrication method of the invention was implemented with the following parameters:

composition of the mixture identical to that corresponding to tests 30 to 44,
contact time with chill roll 13 cooled 125° C.: roughly 88 seconds (speed=0.8 m/sec),
melting temperature: 239° C. to 257° C.,
temperature of the chill roll CR: 125° C.; speed of the chill roll CR: 0.7 to 0.8 meters per minute,
temperature of the first rolls 20, R1, R2, R3, R4, R5: between 50° C. and 90° C.,
temperature of the last roll 20, R6: 100° C.,
longitudinal stretching ratio MD: 5.7 to 5.
T R7=100° C., T R8=50° C., T R9=70° C.,
TZ1=145° C. except for Test 110 in which TZ1=143° C.,
TZ2=148° C., except for Test 101 in which TZ2=147° C. and for Test 110 in which TZ2=146° C.,
TZ3=149° C. except for Test 101, in which TZ3=148.5° C. and for Test 110 in which TZ3=3=147° C.,
TZ4=146° C. except for Test 101 in which TZ4=148° C.,
TZ5=140° C.,
TZ6=135° C.,
transverse stretching ratio: 4,
NIR: 0.28,
proportion of β phase: ≥70%
Gurley porosity POR1 is expressed in seconds per 100 cm³,
Gurley porosity after oven POR2 is measured in seconds per 100 cm³ after spending 20 minutes in a 120° C. oven,
transverse shrinkage in the table below was measured at 120° C.

The following characteristics were then measured:
surface density in both direction ≤0.400 g/cm²;
measured Gurley porosity: <180 sec and >100 sec,
porosity in percentage: >55%,
film longitudinal modulus of elasticity: ≥1000 MPa (ASTM D 882),
film transverse modulus of elasticity: ≥300 MPa (ASTM D 882),
the longitudinal shrinking of the film of micrometric thickness less than or equal to 16 μm or 17 μm (or of micrometric thickness of 15 μm±1 μm) after 15 minutes at 120° C. is less than 3%,
the transverse shrinking of the film of micrometric thickness less than or equal to 16 μm or 17 μm (or of micrometric thickness of 15 μm±1 μm) after 15 minutes at 120° C. is less than 7%,
the space factor is greater than or equal to 145%.

TABLE 9

| Test | MT (μm) | Fe (%) | Density (g/cm3) | Copol/PP homo | Gurley porosity POR1 | Transverse shrinkage (%) | Gurley porosity oven after POR2 |
|---|---|---|---|---|---|---|---|
| 101 | 16.1 | 190.4 | 0.312 | 20/80 | 150 | 3.96 | 230 |
| 102 | 15.1 | 170.7 | 0.334 | 20/80 | 144 | 4.62 | 225 |
| 103 | 16.0 | 164.1 | 0.343 | 20/80 | 162 | 4.8 | 220 |
| 104 | 15.7 | 153.9 | 0.356 | 20/80 | 164 | 4.45 | 255 |
| 105 | 14.1 | 163.7 | 0.336 | 20/80 | 158 | 4.38 | 230 |
| 106 | 14.6 | 164.1 | 0.343 | 20/80 | 171 | 4.05 | 240 |
| 107 | 14.2 | 164.9 | 0.342 | 20/80 | 148 | 4.34 | 220 |
| 108 | 14.1 | 162.5 | 0.345 | 20/80 | 158 | 3.6 | 235 |
| 109 | 16.3 | 150.5 | 0.361 | 20/80 | 144 | 4.51 | 205 |
| 110 | 15.1 | 149.1 | 0.363 | 20/80 | 172 | 4.95 | 300 |

Generally, the film of the invention also has large Young's moduli in the longitudinal direction MD and in the transverse direction TD (moduli of elasticity) according to the ASTM D882 standard. The longitudinal modulus of elasticity is greater than or equal to 600 MPa, even greater than or equal to 700 MPa, by having, for example, a value of 730 MPa for an example of porous film fabricated according to the invention. The transverse modulus of elasticity is greater than or equal to 300 MPa, even greater than or equal to 400 MPa, by having, for example, a value of 445 MPa for an example of porous film fabricated according to the invention.

The film of the invention also has a breakdown voltage greater than or equal to 330 V/μm (micrometric thickness).

The film of the invention also has a low shrinkage in the longitudinal direction and in the transverse direction.

FIGS. 14 and 15 show the shrinkages for a film of the invention with a micrometric thickness of 25 μm±2 μm. Generally, shrinkage values are shown for a heating time of 15 minutes at the cited temperature.

In FIG. 14, shrinkage in the longitudinal direction MD is less than or equal to 4% at 120° C. and is less than or equal to 9% at 140° C. for a porous film of the invention.

In FIG. 15, shrinkage in the transverse direction TD is less than or equal to 13% at 120° C. and is less than or equal to 27% at 140° C. for the porous film of the invention.

It is seen in FIG. 16 that, in tests 34 to 35, transverse shrinkage at 120° C. of the film of micrometric thickness less than or equal to 20 μm (or 21 μm) or of micrometric thickness of 20 μm±1 μm is less than 8%. In these tests 34 to 35, transverse shrinkage at 135° C. of the film of micrometric thickness less than or equal to 20 μm (or 21 μm) or of micrometric thickness of 20 μm±1 μm is less than 18%.

It is seen in FIG. 17 that, in tests 34 to 35, longitudinal shrinkage at 120° C. of the film of micrometric thickness less than or equal to 20 μm (or 21 μm) or of micrometric thickness of 20 μm±1 μm is less than 3%. In these tests 34 to 35, longitudinal shrinkage at 135° C. of the film of micrometric thickness less than or equal to 20 μm (or 21 μm) or of micrometric thickness of 20 μm±1 μm is less than 7%.

These characteristics make the film suited to the fabrication of elements for storing electrical energy, notably due to the thermal stability of the porous film and its limited shrinkage.

Moreover, the film is less prone to breaking during fabrication, due to its mechanical stability.

Film embodiments for various energy storage applications are described below.

Supercapacitors

The film according to the invention forms, for example, the separator in a supercapacitor, said separator forming with electrolyte the capacitor's dielectric. To avoid the problems inherent with cellulose separators, the solution is to turn to a separator whose performance combines both electrochemical and chemical inertia with respect to standard organic electrolytes (acetonitrile with a $TEABF_4$ salt, propylene carbonate with a $TEABF_4$ salt) or aqueous electrolytes (KOH in water or highly concentrated sulfuric acid). At the same time, the separator must withstand winding without becoming deformed, must be of relatively low cost, must be porous (porosity greater than 55%, better if greater than 70%) with a Gurley permeability value of less than 150. Lastly, the separator must be easily impregnable, which is the case with cellulose separators but more rarely the case for polymer separators, which are anisotropic.

The separator produced from the film of the invention according to example 1 exhibits mechanical characteristics that are very superior to those obtained for the cellulose separator of the comparative examples 1 and 2, notably concerning tensile strain at break (FIG. 4 and Table 10), which is greater than 50 MPa for the porous film of the invention. The test presented follows the ISO 1924/2-1985, ASTM 5882 standard.

TABLE 10

| | Name | Micrometric thickness | Density | Porosity (%) | Lifespan (floating 2.8 V/70° C.) in hours | Strain at break (Mpa) |
|---|---|---|---|---|---|---|
| Example 1 | Example of the invention | 25 μm | 0.27 | 70% | 900 | 57 |
| Comparative Example 1 | NKK TF4035 | 35 μm | 0.40 | 75% | 750 | 22.5 |
| Comparative Example 2 | NKK TF4425 | 25 μm | 0.44 | 72% | 750 | 26 |

As shown by the results, the separator of example 1 is particularly resistant from a mechanical point of view, although it is lighter than the cellulose separator. This is due to its continuous three-dimensional structure: the polymer chains are chemically hung on each other (FIG. 5, example of a film with a density of 0.319). As shown in FIG. 5 (SEM image), the structure can be compared to an interlaced and interconnected jumble of spaghetti. This particular structure gives to the film thus fabricated particularly high porosity and sufficiently high tortuosity to avoid any problem of short-circuit between the two electrodes positioned on each side of the separator. In the case of cellulose, the separator is made from fibers calendered on each other: the risk of deformation is thus greater, which can potentially generate problems of short-circuits between electrodes, due to the film's brittleness.

The electrochemical performance of the separator according to the invention (Example 1, corresponding to test 10) is also greater than that obtained with cellulose-based film (Table 10) in terms of lifespan (+20%). The tests were carried out with Batscap 650F supercapacitors (floating) at 70° C. and a unit voltage of 2.8 V.

Cells or Batteries Functioning in an Organic Medium in Liquid or Gel Form

The film of the invention can be used to form the separator of such cells or batteries.

Tests were carried out on the film in view of its application for batteries functioning in an organic medium. The example described herein relates to lithium-ion (Li-ion) batteries, whose requisite characteristics are the most restrictive from both an electrochemical and a chemical point of view.

In the case of Li-ion batteries, the electrolyte used is 1 M $LiPF_6$ in a 1:1:1 mixture of EC/DEC/DMC.

To improve the safety of these batteries, which can present risks of short-circuit leading to irreversible degradation of the component (component catching fire), the film fabricated according to the invention can be made dissymmetrical between its two faces during its fabrication. For example, a different temperature is applied to the first face F10 of the film F in contact with the chill roll CR and to the opposite second face F20 of the film F. For example, an air knife or air wind colder than the chill roll CR is applied to the opposite second face F20 of the film F. The roughness of the first face F10 is thus greater than the roughness of the second face F20. The roughness of the first face F10 is, for example, greater than or equal to 150% of the roughness of the second face F20. The first face F10 turned to the chill roll CR has less porosity than the other second face F20. This improves performance in terms of component aging and safety. It is important to note that in the event the component overheats (T>160° C.), the film becomes transparent and loses its porosity (the pores close) during the increase in temperature, which leads to the electrical and electrochemical insulation of the two electrodes. This thus reduces the risk of the component catching fire. An example of dissymmetrical film (obtained by different temperatures on the chill roll CR and a hot air knife to press the film on this same chill roll CR) is given in FIG. 6 representing at top in the frame an enlarged view of the face F1 turned to the chill roll CR and at bottom an enlarged view of the face F20 turned to the air knife. The principle is illustrated in FIG. 7 on a thickness in profile.

This dissymmetrical film avoids the formation of dendrites which can be found in lithium batteries (ion or metal polymer) and thus avoids any risk of short-circuit by this failure mode which creates a risk of component fire.

In the event of an autopsy on the component having undergone a too high increase in temperature, the film can thus constitute irrefutable proof as a tracer with respect to the thermal history of the component (failure mode identification).

Film that can be used in this type of battery must be thin (less than 25 µm, better if less than 15 µm) and be porous enough to allow lithium ions to pass between the two electrodes. The porosity of this film must be at least greater than 30% but must also be strong mechanically. The invention enables the fabrication of a film with porosity greater than 50% while being very strong mechanically (puncture strength, measured according to the ASTM D3420 standard, is multiplied by at least 2 in relation to a film fabricated by uniaxial cold drawing, at identical thickness). Test 6 demonstrates these properties (55% porosity with 19.4 µm micrometric thickness).

Polyolefins being hydrophobic, the residual quantity of water within the separator is very small (a few tens of ppm). Furthermore, since the film does not contain mineral filler, it does not have a negative impact on aging. These properties make it possible industrially to have no need to degas the component at high temperature (typically above 110° C.) to remove water (saving time and reducing cost).

Cells or Batteries Functioning in an Aqueous Medium in Liquid or Gel Form

The film according to the invention can be used to form the separator of such cells or batteries.

In the state of the art, separators used in energy storage systems functioning in an aqueous medium generally contain glass fiber. In the case of lead-acid batteries, these separators are expensive, relatively thick (greater than 40 µm) and fragile mechanically (which explains the micrometric thickness required to be easy to handle), but have the advantage of being highly porous (greater than 70%). Furthermore, the requisite micrometric thickness is generally used to contain the electrolyte used in the energy storage system.

The film fabricated according to the invention (Test 1) has the advantage of being able both to be thick in order to contain the electrolyte and to be highly porous (62% for Test 1). The film produced is very strong mechanically as was seen in the preceding examples, and has both characteristics of chemical strength (inert for strong acids such as sulfuric acid or strong bases such as potash or soda) and electrochemical strength (voltage greater than 5 V with no degradation of the film).

The film can thus advantageously be used in lead-acid or nickel-metal hydride (Ni-MH) batteries.

Electrolytic Capacitors

The film according to the invention can be used to form the separator of such electrolytic capacitors. The film of the invention can be metallized.

The film fabricated according to the invention can easily be substituted for the standard cellulose separator used in this technology.

The breakdown voltage of the film described in the invention is on the order of 3500 V (Test 9 film). As a result, a thin, 25 µm film performs sufficiently well to advantageously replace three thicknesses of cellulose separators, each 25 µm (gain in volume and weight).

From a technological point of view, the metal, for example aluminum, used to collect current (cathode) is etched electrochemically to increase the surface in contact with the electrolyte. A solution for avoiding the use of this layer of aluminum is to deposit aluminum under vacuum directly on the separator formed of the film according to the invention. This is difficult to carry out on a cellulose separator because of the poor mechanical strength between the cellulose fibers and the deposited metal.

FIGS. 8 and 9 demonstrate schematically the succession of layers of an electrolytic capacitor C, successively comprising a metal anode A, formed, for example, of an aluminum film, containing a deposition of alumina, an electrolyte E, a separator S formed of the porous film F according to the invention, and a cathode CATH.

The porous film F described in the present invention can be covered on one face by a deposited metal M forming the cathode CATH, this metal M being, for example, deposited under vacuum, such as for example aluminum.

The metal M used can be aluminum, zinc, silver or any other metal usable in electrolytic capacitor technologies.

FIG. 9 represents the configuration during winding of the anode A, of the film F, S and of the cathode M, CATH. After winding, the entirety is impregnated with electrolyte E, which will penetrate between the anode A and the separator F, S.

Two embodiments of a wound component C of an electrolytic capacitor are described in FIGS. 10 and 11.

In the embodiment of FIG. 10, the winding combines a standard anode film A and two first and second films F1, F2 according to the invention each containing on one face a deposition of metal M, for example aluminum. When the component C is wound, the deposition surfaces M are opposite each other and are sandwiched between the films F1, F2 of the porous polymer. The film of anode A is sandwiched between the two films F1, F2 forming the separator S, with the anode A being against the non-metallized face of each of the two films F1, F2.

The advantage is to use two identical films F1, F2 having a deposition on one face placed face-to-face to increase the current collection surface.

It should be noted that the polymeric film being porous gives the deposition of metal M a very large surface of contact with the electrolyte (E) (at least as large as for standard film). Indeed, the roughness of the polymeric film is particularly high.

In the embodiment of FIG. 11, a standard anode film A, a spool of a first porous film F1 according to the invention containing on one face a deposition of metal M, for example of aluminum, and another second spool of porous polymeric film F2 according to the invention without metal deposition are used successively during winding. Only one spool of metallized film F1 is used. The anode film A has one side against the non-metallized face of the first film F1 and the other side against the second non-metallized film F2. This makes it possible to obtain characteristics close to proposal 1 but at a lower price (film with no deposition is cheaper than film with deposition).

In this embodiment, the spool of film with no deposition can also be of cellulose.

In the embodiments of FIGS. 10 and 11, the spools of films F1 and F2 other than the anode film A can be multiple (stacking of several successive layers of insulator).

In FIG. 12, the heavy arrows indicate the side by which, in the proposed configuration, terminals can be fabricated from the metallized porous film of FIG. 11. These terminals can be fabricated by shoopage for example. These terminals are located on edges distant from each other.

In the case of the anode A, the junction between the various aluminum films can be created according to traditional methods as described in numerous patents.

For the cathode CATH, aluminum can be projected on the surface on the side 100. This then makes it possible to add a wire. This technique is already used in large dielectric capacitors and is widespread.

Another solution also widely used consists in welding a wire directly onto the film (anode or cathode). This is possible in the case of a porous film with a deposition of aluminum (an additional projection of material can also be added as described for deposition on sections, above). For this cathode film, the deposition can be made on the last outside turn, whereas the wire for the anode can be placed in the center.

This widely-used method makes it possible to position the two terminals on the same side, which the proposal of FIG. 12 does not allow.

Following winding, the component is impregnated with electrolyte.

The electrolyte is generally boric acid or sodium borate in aqueous solution with various sugars or ethylene glycol added to delay evaporation.

There are three broad types of water-based electrolytes for aluminum electrolytic capacitors: based on standard water (40-70% water) and those containing ethylene glycol or dipropyl ketone (together with water less than 25%). There are a certain number of non-aqueous electrolytes, which use only a small quantity of water. Electrolytes are generally composed of a weak acid, a weak acid salt and a solvent thickener, optionally containing various additives.

Weak acids are generally organic in nature (acetic acid, lactic acid, propionic acid, butyric acid, crotonic acid, acrylic acid, phenol, cresol, etc.) or boric acid. The salts used are often ammoniums salts or metal salts of organic acids (ammonium acetate, ammonium citrate, aluminum acetate, calcium lactate, ammonium oxalate, etc.) or the weak inorganic acids (sodium perborate, trisodium phosphate, etc.).

The advantage of the porous polymer separator is to be inert chemically and electrochemically to all the electrolytes described above. As a result, the use of this type of separator can be generalized to all liquid electrolytic capacitors.

The principle described herein can also be generalized to solid electrolytic capacitor technologies (solid electrolyte) and to tantalum liquid electrolyte capacitors.

The metal used can be different than aluminum.

The deposition of metal M on the film F1, F2 can be achieved by evaporation, but also by projection or any other method suited to the creation of a deposition whose material purity is controlled and of which the method does not melt the polymer (the porosity of the film must be preserved on the side opposite the deposition of metal).

According to one embodiment, the space factor Fe is selected to be less than or equal to 300%.

The invention claimed is:

1. A separator film for a device used for storing electrical energy, the film being porous and oriented, and being obtained by stretching in a longitudinal direction and in a direction transverse to the longitudinal direction, the film containing a mixture comprising:
 a polypropylene homopolymer,
 at least 10% by weight of at least one copolymer of monomers comprising at least propylene and ethylene,
 at least one beta-nucleating agent,
wherein the copolymer has an ethylene content greater than or equal to 1% and less than 10% by weight of the copolymer and a propylene content of at least 90% by weight of the copolymer for a micrometric thickness of the film greater than or equal to 8 microns and less than or equal to 30 microns, corresponding to a space factor determined according to the IEC-60674-3-1 standard greater than or equal to 145% and a density of the film stretched in both directions greater than or equal to 0.18 g/cm$^3$ and less than or equal to 0.41 g/cm$^3$.

2. The film of claim 1, wherein the beta-nucleating agent contains quinacridone.

3. The film of claim 1, wherein the beta-nucleating agent consists of gamma-quinacridone.

4. The film of claim 1, wherein the beta-nucleating agent consists of gamma-quinacridone in a proportion greater than or equal to 0.11% and less than or equal to 0.5% by weight.

5. The film of claim 1, wherein the film stretched in both directions has a Gurley porosity greater than or equal to 50 seconds and less than or equal to 300 seconds per 100 cm$^3$.

6. The film of claim 1, wherein the film stretched in both directions has a porosity in percent greater than or equal to 50%.

7. The film of claim 1, wherein the film has a longitudinal modulus of elasticity greater than or equal to 800 MPa according to the ASTM D882 standard and/or a transverse modulus of elasticity greater than or equal to 300 MPa according to the ASTM D882 standard.

8. The film of any claim 1, wherein the mixture further comprises calcium stearate in a proportion of 25 to 250 mg/kg of mixture.

9. The film of claim 1, wherein the transverse shrinking of the film of micrometric thickness less than or equal to 20 μm at 120° C. is less than 8%.

10. The film of claim 1, wherein for a temperature greater than or equal to 150° C., the film has a Gurley porosity greater than or equal to 5000 seconds.

11. A method for fabricating a separator film for a device used for storing electrical energy, the film being porous and oriented, the film containing a mixture comprising:
a polypropylene homopolymer,
at least 10% by weight of at least one copolymer of monomers comprising at least propylene and ethylene,
at least one beta-nucleating agent,
wherein the copolymer has an ethylene content greater than or equal to 1% and less than 10% by weight of the copolymer and a propylene content of at least 90% by weight of the copolymer and a propylene content of at least 90% by weight of the copolymer for a micrometric thickness of the film greater than or equal to 8 microns and less than or equal to 30 microns, corresponding to a space factor determined according to the IEC-60674-3-1 standard greater than or equal to 145% and a density of the film stretched in both directions greater than or equal to 0.18 g/cm$^3$ and less than or equal to 0.41 g/cm$^3$,
and wherein, during a first step said mixture being melt is passed on a chill roll (CR, 13), which rotates and which has a temperature less than the temperature of the mixture being melt to obtain a primary film (F), the primary film (F) is stretched in its longitudinal conveying direction (MD) during a second step after the first step, the film (F) is stretched in the direction transverse (TD) to the longitudinal direction (MD), the method being characterized in that during the first step, said mixture being melt has a time in contact with the chill roll (CR, 13) greater than or equal to 30 seconds.

12. An electrical supercapacitor, comprising at least two electrical conductors connected to at least two use terminals, wherein at least one separator film of claim 1 and an electrolyte impregnating the film are between the two electrical conductors.

13. A battery for storing electrical energy, comprising at least two electrical conductors connected to at least two use terminals, wherein at least one separator film of claim 1 and an electrolyte impregnating the film are between the two electrical conductors.

14. An electrolytic capacitor, comprising an anode (A) and a cathode (CATH), between which is located at least one separator film of claim 1 and an electrolyte impregnating the film.

15. The electrolytic capacitor of claim 14, wherein cathode is formed by a metal deposition (M) on only one face of said at least one film.

* * * * *